United States Patent
Yi et al.

(10) Patent No.: US 11,915,383 B2
(45) Date of Patent: Feb. 27, 2024

(54) METHODS AND SYSTEMS FOR HIGH DEFINITION IMAGE MANIPULATION WITH NEURAL NETWORKS

(71) Applicants: Zili Yi, Burnaby (CA); Qiang Tang, Burnaby (CA); Vishnu Sanjay Ramiya Srinivasan, Coquitlam (CA); Zhan Xu, Richmond (CA)

(72) Inventors: Zili Yi, Burnaby (CA); Qiang Tang, Burnaby (CA); Vishnu Sanjay Ramiya Srinivasan, Coquitlam (CA); Zhan Xu, Richmond (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 17/367,524

(22) Filed: Jul. 5, 2021

(65) Prior Publication Data

US 2023/0019851 A1     Jan. 19, 2023

(51) Int. Cl.
*G06T 3/00*       (2006.01)
*G06T 3/40*       (2006.01)
(Continued)

(52) U.S. Cl.
CPC .............. *G06T 3/0093* (2013.01); *G06T 3/40* (2013.01); *G06T 3/4046* (2013.01);
(Continued)

(58) Field of Classification Search
CPC ....... G06T 3/0093; G06T 3/40; G06T 3/4007; G06T 3/4046; G06T 3/4053–4076;
(Continued)

(56) References Cited

U.S. PATENT DOCUMENTS

| 10,325,395 B2 | 6/2019 | Mckenzie et al. |
| 10,600,224 B1 | 3/2020 | Mckenzie et al. |

(Continued)

FOREIGN PATENT DOCUMENTS

| CN | 106651766 A | 5/2017 |
| CN | 110689562 A | 1/2020 |

(Continued)

OTHER PUBLICATIONS

Yi, Zili, et al. "Contextual Residual Aggregation for Ultra High-Resolution Image Inpainting." arXiv preprint arXiv:2005.09704v1 (2020). (Year: 2020).*

(Continued)

*Primary Examiner* — Geoffrey E Summers

(57) ABSTRACT

Methods and systems for high-resolution image manipulation are disclosed. An original high-resolution image to be manipulated is obtained, as well as a driving signal indicating a manipulation result. The original high-resolution image is down-sampled to obtain a low-resolution image to be manipulated. Using a trained manipulation generator, a low-resolution manipulated image and a motion field are generated from the low-resolution image. The motion field represent pixel displacements of the low-resolution image to obtain the manipulation indicated by the driving signal. A high-frequency residual image is computed from the original high-resolution image. A high-frequency manipulated residual image is generated using the motion field. A high-resolution manipulated image is outputted by combining the high-frequency manipulated residual image and a low-frequency manipulated image generated from the low-resolution manipulated image by up-sampling.

20 Claims, 8 Drawing Sheets

(51) Int. Cl.
    *G06V 40/16*         (2022.01)
    *G06T 11/60*         (2006.01)

(52) U.S. Cl.
    CPC .......... *G06T 3/4069* (2013.01); *G06T 3/4076* (2013.01); *G06T 11/60* (2013.01); *G06V 40/162* (2022.01)

(58) Field of Classification Search
    CPC . G06T 2207/20081; G06T 2207/20084; G06T 13/00–80; G06T 11/60; G06N 3/02–0985; G06V 10/82; G06V 40/16–171
    See application file for complete search history.

(56) References Cited

U.S. PATENT DOCUMENTS

| | | |
|---|---|---|
| 2019/0378318 A1 | 12/2019 | Roache et al. |
| 2021/0150678 A1 | 5/2021 | Yi et al. |

FOREIGN PATENT DOCUMENTS

| | | |
|---|---|---|
| CN | 111768342 A | 10/2020 |
| CN | 112232362 A | 1/2021 |
| KR | 20200084434 A | 7/2020 |
| WO | 2021085743 A1 | 5/2021 |

OTHER PUBLICATIONS

Dorta, Garoe, et al. "The GAN That Warped: Semantic Attribute Editing With Unpaired Data." 2020 IEEE/CVF Conference on Computer Vision and Pattern Recognition (CVPR). IEEE, 2020. (Year: 2020).*
ShahRukh Athar, Zhixin Shu, and Dimitris Samaras, Self-supervised Deformation Modeling for Facial Expression Editing, arXiv preprint arXiv:1911.00735 Nov. 5, 2019.
Mohammad Babaeizadeh, Chelsea Finn, Dumitru Erhan, Roy H Campbell, and Sergey Levine, Stochastic variational video prediction. arXi preprint arXiv:1710.11252 Mar. 5, 2018.
Guha Balakrishnan, Amy Zhao, Adrian V Dalca, Fredo Durand, and John Guttag, Synthesizing images of humans in unseen poses, In Proceedings of the IEEE Conference on Computer Vision and Pattern Recognition, pp. 8340-8348 Apr. 20, 2018.
Adrian Bulat and Georgios Tzimiropoulos, How far are we from solving the 2d & 3d face alignment problem?(and a dataset of 230,000 3d facial landmarks), In Proceedings of the IEEE International Conference on Computer Vision, pp. 1021-1030 Sep. 7, 2017.
Peter Burt and Edward Adelson, The Laplacian pyramid as a compact image code. IEEE Transactions on communications, vol. 31, No. 4 pp. 532-540 Apr. 1983.
Emily Denton and Rob Fergus, Stochastic video generation with a learned prior, arXiv preprint arXiv.T802.07687 Mar. 2, 2018.
Yuki Endo, Yoshihiro Kanamori, and Shigeru Kuriyama, Animating landscape: self-supervised learning of decoupled motion and appearance for single-image video synthesis, arXiv preprint arXiv:1910.07192 Oct. 16, 2019.
C Fabian Benitez-Quiroz, Ramprakash Srinivasan, and Aleix M Martinez, Emotionet: An accurate, real-time algorithm for the automatic annotation of a million facial expressions in the wild, In Proceedings of the IEEE conference on computer vision and pattern recognition, pp. 5562-5570 2016.
Chelsea Finn, Ian Goodfellow, and Sergey Levine, Unsupervised learning for physical interaction through video prediction, In Advances in neural information processing systems, pp. 64-72 Oct. 17, 2016.
Elizabeth A. Clark, J'Nai Kessinger, Susan E. Duncan, Martha Ann Bell, Jacob Lahne, Daniel L. Gallagher and Sean F. O'Keefe, The Facial Action Coding System for Characterization of Human Affective Response to Consumer Product-Based Stimuli: A Systematic Review, Front. Psychol. May 26, 2020.

Aviv Gabbay and Yedid Hoshen, Style generator inversion for image enhancement and animation, arXiv preprint arXiv:1906.11880 Jun. 5, 2019.
Jiahao Geng, Tianjia Shao, Youyi Zheng, Yanlin Weng, and Kun Zhou. 2018. Warp-guided gans for single-photo facial animation. ACM Transactions on Graphics (TOG) vol. 37, No. 6, pp. 1-12 Nov. 2018.
Ian Goodfellow, NIPS 2016 tutorial: Generative adversarial networks, arXiv preprint arXiv.T701.00160 Apr. 3, 2017.
Kuangxiao Gu, Yuqian Zhou, and Thomas Huang, FLNet: Landmark Driven Fetching and Learning Network for Faithful Talking Facial Animation Synthesis, arXiv preprint arXiv.T911.09224 Nov. 21, 2019.
Ishaan Gulrajani, Faruk Ahmed, Martin Arjovsky, Vincent Dumoulin, and Aaron Courville, Improved Training of Wasserstein GANs, In Advances in neural information processing systems, pp. 5767-5777 Dec. 25, 2017.
Muhammad Hassan, Yutong Liu, Linghe Kong, Ziming Wang, and Guihai Chen, GANemotion: Increase Vitality of Characters in Videos by Generative Adversary Networks, In 2019 International Joint Conference on Neural Networks (IJCNN), IEEE, pp. 1-8 Jul. 2019.
Martin Heusel, Hubert Ramsauer, Thomas Unterthiner, Bernhard Nessler, and Sepp Hochreiter, GANs trained by a two time-scale update rule converge to a local nash equilibrium, In Advances in neural information processing systems, pp. 6626-6663 Jan. 12, 2018.
Satoshi Iizuka, Edgar Simo-Serra, and Hiroshi Ishikawa. 2017. Globally and locally consistent image completion. ACM Transactions on Graphics (ToG), vol. 36, No. 4, pp. 1-14 Jul. 2017.
Eddy Ilg, Nikolaus Mayer, Tonmoy Saikia, Margret Keuper, Alexey Dosovitskiy, and Thomas Brox, Flownet 2.0: Evolution of optical flow estimation with deep networks, In Proceedings of the IEEE conference on computer vision and pattern recognition, pp. 2462-2470 Dec. 6, 2016.
Tero Karras, Samuil Laine, and Timo Alia, A style-based generator architecture for generative adversarial networks, In Proceedings of the IEEE Conference on Computer Vision and Pattern Recognition, pp. 4401-4410 Mar. 29, 2019.
Iryna Korshunova, Wenzhe Shi, Joni Dambre, and Lucas Theis, Fast face-swap using convolutional neural networks, In Proceedings of the IEEE International Conference on Computer Vision, pp. 3677-3685 Jul. 27, 2017.
Wei-Sheng Lai, Jia-Bin Huang, Oliver Wang, Eh Shechtman, Ersin Yumer, and Ming-Hsuan Yang, Learning blind video temporal consistency. In Proceedings of the European Conference on Computer Vision (ECCV), pp. 170-185 Aug. 1, 2018.
Oliver Langner, Ron Dotsch, Gijsbert Bijlstra, Daniel HJ Wigboldus, Skyler T Hawk, and AD Van Knippenberg, Presentation and validation of the Radboud Faces Database. Cognition and emotion, vol. 24, No. 8, pp. 1377-1388 Nov. 24, 2010.
Chih-Yang Lin, Yun-Wen Huang, and Timothy K Shih, Creating waterfall animation on a single image. Multimedia Tools and Applications, vol. 78, No. 6, pp. 6637-6653 Jul. 25, 2018.
Ziwei Liu, Ping Luo, Xiaogang Wang, and Xiaoou Tang, Deep learning face attributes in the wild, In Proceedings of the IEEE international conference on computer vision, pp. 3730-3738 Sep. 24, 2015.
Mehdi Mirza and Simon Osindero, Conditional generative adversarial nets, arXiv preprint arXiv.T411.1784 Nov. 6, 2014.
Seonghyeon Nam, Chongyang Ma, Menglei Chai, William Brendel, Ning Xu, and Seon Joo Kim, End-to-end time-lapse video synthesis from a single outdoor image, In Proceedings of the IEEE conference on computer vision and pattern recognition, pp. 1409-1418 Apr. 1, 2019.
Yuval Nirkin, Yosi Keller, and Tai Hassner, FSGAN: Subject agnostic face swapping and reenactment, In Proceedings of the IEEE International Conference on Computer Vision, pp. 7184-7193 Aug. 16, 2019.
Albert Pumarola, Antonio Agudo, Aleix M Martinez, Alberto Sanfeliu, and Francesc Moreno-Noguer, Ganimation: Anatomically-aware

(56) References Cited

OTHER PUBLICATIONS facial animation from a single image, In Proceedings of the European Conference on Computer Vision (ECCV), pp. 818-833 Aug. 28, 2018.
Omkar M Parkhi, Andrea Vedaldi, and Andrew Zisserman, Deep face recognition 2015.
Andreas Rossler, Davide Cozzolino, Luisa Verdoliva, Christian Riess, Justus Thies, and Matthias Niefiner, Faceforensics: A large-scale video dataset for forgery detection in human faces, arXiv preprint arXiv:1803.09179 Mar. 14, 2018.
Enrique Sanchez and Michel Valstar, Triple consistency loss for pairing distributions in GAN-based face synthesis, arXivpreprint arXiv: 1811.03492 Nov. 8, 2018.
Florian Schroff, Dmitry Kalenichenko, and James Philbin, Facenet: A unified embedding for face recognition and clustering, In Proceedings of the IEEE conference on computer vision and pattern recognition, pp. 815-823 Jun. 17, 2015.
Guangyao Shen, Wenbing Huang, Chuang Gan, Mingkui Tan, Junzhou Huang, Wenwu Zhu, and Boqing Gong, Facial Image-to-Video Translation by a Hidden Affine Transformation, In Proceedings of the 27th ACM international conference on Multimedia, pp. 2505-2513, Oct. 21-25, 2019.
Aliaksandr Siarohin, Stephane Lathuiliere, Sergey Tulyakov, Elisa Ricci, and Nicu Sebe, Animating arbitrary objects via deep motion transfer, In Proceedings of the IEEE Conference on Computer Vision and Pattern Recognition, pp. 2377-2386 Aug. 30, 2019.
Aliaksandr Siarohin, Stephane Lathuiliere, Sergey Tulyakov, Elisa Ricci, and Nicu Sebe, First order motion model for mage animation, In Advances in Neural Information Processing Systems, pp. 7137-7147 2019.
Zackary PT Sin, Peter HF Ng, Simon CK Shiu, Fu-lai Chung, and Hong Va Leong, 2D character animating networks: bringing static characters to move via motion transfer, In Proceedings of the 34th ACM/SIGAPP Symposium on Applied Computing, pp. 196-203 Apr. 2019.
Kritaphat Songsri-in and Stefanos Zafeiriou, Face Video Generation from a Single Image and Landmarks, arXiv preprint arXiv:1904.11521 Apr. 25, 2019.
Soumya Tripathy, Juho Kannala, and Esa Rahtu, Icface: Interpretable and controllable face reenactment using gans, In The IEEE Winter Conference on Applications of Computer Vision Jan. 2020.
Ruben Villegas, Jimei Yang, Yuliang Zou, Sungryull Sohn, Xunyu Lin, and Honglak Lee, Learning to generate long-term future via hierarchical prediction, In Proceedings of the 34th International Conference on Machine Learning—vol. 70, JMLR. org, pp. 3560-3569 Jan. 8, 2018.
Carl Vondrick, Hamed Pirsiavash, and Antonio Torralba, Generating videos with scene dynamics, In Advances in neural information processing systems, pp. 613-621 2016.
Konstantinos Vougioukas, Stavros Petridis, and Maja Pantic, Realistic speech-driven facial animation with GANs, International Journal of Computer Vision, pp. 1-16 Jun. 14, 2019.
Ting-Chun Wang, Ming-Yu Liu, Andrew Tao, Guilin Liu, Jan Kautz, and Bryan Catanzaro, Few-shot video-to-video synthesis, arXiv preprint arXiv: 1910.12713 2019.
Kueping Wang, Yunhong Wang, and WeixinLi, U-Net Conditional GANs for Photo-Realistic and Identity-Preserving Facial Expression Synthesis. ACM Transactions on Multimedia Computing, Communications, and Applications (TOMM), vol. 15, No. 3s, pp. 1-23 Oct. 2019.
Olivia Wiles, Sophia Koepke, and Andrew Zisserman, X2face: A network for controlling face generation using images, audio, and pose codes, In Proceedings of the European Conference on Computer Vision (ECCV), pp. 670-686 Jul. 27, 2018.
Holger Winnembller, Jan Eric Kyprianidis, and Sven C Olsen, XDoG: an extended difference-of-Gaussians compendium including advanced image stylization, Computers & Graphics, vol. 36, Issue. 6, pp. 740-753 2012.
Ruizheng Wu, Xin Tao, Xiaodong Gu, Xiaoyong Shen, and Jiaya Jia, Attribute-Driven Spontaneous Motion in Unpaired Image Translation, In Proceedings of the IEEE International Conference on Computer Vision, pp. 5923-5932 Oct. 11, 2019.
Wayne Wu, Yunxuan Zhang, Cheng Li, Chen Qian, and Chen Change Loy, Reenactgan: Learning to reenact faces via boundary transfer, In Proceedings of the European Conference on Computer Vision (ECCV), pp. 603-619 Jul. 29, 2018.
Shi Xingjian, Zhourong Chen, Hao Wang, Dit-Yan Yeung, Wai-Kin Wong, and Wang-chun Woo, Convolutional LSTM network: A machine learning approach for precipitation nowcasting, In Advances in neural information processing systems, pp. 802-810 Sep. 19, 2015.
Zill Yi, Hao Zhang, Ping Tan, and Minglun Gong, DualGAN: Unsupervised dual learning for image-to-image translation, In Proceedings of the IEEE international conference on computer vision, pp. 2849-2857 Oct. 9, 2018.
Egor Zakharov, Aliaksandra Shysheya, Egor Burkov, and Victor Lempitsky, Few-shot adversarial learning of realistic neural talking head models, In Proceed¬ings of the IEEE International Conference on Computer Vision, pp. 9459-9468 Sep. 25, 2019.
Yunxuan Zhang, Siwei Zhang, Yue He, Cheng Li, Chen Change Loy, and Ziwei Liu, One-shot Face Reenactment, arXiv preprint arXiv:1908.0325 Aug. 5, 2019.
Yong Zhao, Meshia Cedric Oveneke, Dongmei Jiang, and Hie hem Sahli, A video prediction approach for animating single face image. Multimedia Tools and Applications, pp. 1-22 Dec. 15, 2018.
Jun-Yan Zhu, Taesung Park, Phillip Isola, and Alexei A Efros, Unpaired image-to-image translation using cycle-consistent adversarial networks, In Proceedings of the IEEE international conference on computer vision, pp. 2223-2232; Aug. 24, 2020.
Zili Yi, Qiang Tang, Vishnu Sanjay Ramiya Srinivasan, and Zhan Xu, Animating Through Warping: An Efficient Method for High-Quality Facial Expression Animation, MM '20: Proceedings of the 28th ACM International Conference on Multimedia, Seattle, WA, USA, pp. 1459-1468, Oct. 12-16, 2020.
Yunjey Choi, Youngjung Uh, Jaejun Yoo, Jung-Woo Ha, StarGAN v2: Diverse Image Synthesis for Multiple Domains, CVPR 2020 https://arxiv.org/abs/1912.01865, Apr. 26, 2020.
Zili Yi, Qiang Tang, Shekoofeh Azizi, Daesik Jang, Zhan Xu, Contextual Residual Aggregation for Ultra High-Resolution Image Inpainting, CVPR 2020, https://arxiv.org/abs/2005.09704, May 19, 2020.
U.S. Appl. No. 62/935,992, filed Nov. 15, 2019.
Justus Thies, Michael Zollhofer, Marc Stamminger, Christian Theobalt, Matthias Nießner, Face2face: Real-time face capture and reenactment of rgb videos, In 2016 IEEE Conference on Computer Vision and Pattern Recognition (CVPR), p. 2387-2395; Jul. 29, 2020.

\* cited by examiner

Algorithm 1: Training of our Proposed Network 702 initialization;
704 while *G has not converged* do
706     for *i = 1,...,5* do
708         Sample batch images $\mathbf{I}$ from training data;
710         Randomly sample driving signals $\mathbf{c}_t$;
712         Get manipulated image $\mathbf{O}^r \leftarrow G(\mathbf{I}, \mathbf{c}_t)$;
714         Sample a random number $\alpha \in U[0,1]$;
716         Get interpolation $\hat{\mathbf{I}} \leftarrow (1-\alpha)\mathbf{I} + \alpha \mathbf{O}^r$;
718         Update the discriminator $\mathbf{D}^r$ with loss $l^{D^r}$;
720         Update the discriminator $\mathbf{D}^w$ with loss $l^{D^w}$;
722     end
724     Sample batch images $\mathbf{I}$ from training data;
726     Randomly sample driving signals $\mathbf{c}_t$;
728     Get result $\mathbf{O}^r \leftarrow G(\mathbf{I}, \mathbf{c}_t)$;
730     Update generator G with loss $l_g$;
732 end

FIG. 7

METHODS AND SYSTEMS FOR HIGH DEFINITION IMAGE MANIPULATION WITH NEURAL NETWORKS

TECHNICAL FIELD

The present disclosure relates to the field of image processing, particularly high-definition digital image manipulation using neural networks.

BACKGROUND

Image manipulation refers to a process of bringing changes to a digitized image in order to transform it to a desired image. Image manipulation may include animation, in which a plurality of manipulated images are shown in sequence to appear as moving images. The ability to animate a still digital image of an object or a scene in a controllable, efficient manner enables many interesting applications in the field of image editing/enhancement, including animation, movie post-production, and human-computer interaction. Conventional methods typically require parametric three-dimensional (3D) object/face modeling and then perform animation in the 3D domain as described in "Face2face: Real-time face capture and reenactment of RGB videos" by Stamminger M., Theobalt C., Thies J., Zollhofer M., and NieBner M. (2016 IEEE Conference on Computer Vision and Pattern Recognition (CVPR). 2387-2395), the disclosure of which is incorporated herein in its entirety. Such approaches often require post-processing using computer graphics techniques, expensive equipment, and significant amounts of labor to produce realistic results.

Recent years have seen considerable progress in the field of two-dimensional (2D) based methods of manipulating, such as animating, facial features, animate objects such as humans, and other inanimate objects and scenes. In 2018, a novel architecture known as Ganimation was proposed by Albert Pumarola, Antonio Agudo, Aleix M Martinez, Alberto Sanfeliu, and Francesc Moreno-Noguer in "Ganimation: Anatomically-aware facial animation from a single image" (2018 Proceedings of the European Conference on Computer Vision (ECCV). 818-833). The ganimation approach follows an image-to-image translation paradigm, which permits relatively simple model training and added flexibility of supporting multiple facial expressions through action units (e.g., descriptors of facial actions). However, existing models only support image resolutions up to 256× 256 pixels in size, which may be extended to 512×512 pixels with high-end graphics processing units (GPU's). None of the existing methods is capable of manipulating images of higher resolution such as 1920×1080 pixels or 4000 pixels (4K), which are becoming the mainstream display resolutions nowadays.

It would be desirable to provide an improved technique for image manipulation of high-resolution 2D images.

SUMMARY

In various examples, the present disclosure describes methods and systems for manipulating of high-definition 2D images using a neural network. The disclosed examples enable manipulation of high-definition images to be practically implemented, with greater efficiency and/or requiring fewer resources (e.g., memory resources, processing power) compared to existing 2D based image manipulation techniques.

Examples of the present disclosure may enable manipulation of high-definition 2D images as large as 4 k resolution (which refers to an image having a resolution with a width of approximately 4000 pixels), or higher. Examples of the present disclosure may also enable manipulation of images with sufficient quality and relatively low processing power requirement.

In accordance with a first aspect of the present disclosure, there is provided a method for high-resolution image manipulation. An original high-resolution image to be manipulated is obtained, as well as a driving signal indicating a manipulation result. The original high-resolution image is down-sampled to obtain a low-resolution image to be manipulated. Using a trained manipulation generator, a low-resolution manipulated image and a motion field are generated from the low-resolution image. The motion field represent pixel displacements of the low-resolution image to obtain the manipulation indicated by the driving signal. A high-frequency residual image is computed from the original high-resolution image. A high-frequency manipulated residual image is generated using the motion field. A high-resolution manipulated image is outputted by combining the high-frequency manipulated residual image and a low-frequency manipulated image generated from the low-resolution manipulated image by up-sampling.

In some or all examples of the first aspect, the manipulation generator comprises a motion network and a refinement network, the motion network generating a coarse manipulated output from the low-resolution image, the coarse manipulated output and the low-resolution image being provided as input to the refinement network to output the low-resolution manipulated image with fewer visual artifacts than the coarse manipulated output and the refined motion field.

In some or all examples of the first aspect, the driving signal is any one of an Action Unit (AU) defining facial muscle movements as defined by the Facial Action Coding System (FACS) specifying the manipulation, an image showing the manipulation, and a text phrase describing the manipulation.

In some or all examples of the first aspect, generating of the high-resolution manipulated residual image further comprises: up-sampling the motion field from a resolution of the low-resolution image to a resolution of the original high-resolution image; and applying pixel displacement defined in the up-sampled motion field to the high-resolution residual image.

In some or all examples of the first aspect, the computing of the high-resolution residual image further comprises: up-sampling the low-resolution image to obtain a low-frequency image; subtracting, pixel-wise, the low-frequency image from the original high-resolution image to obtain the high-resolution residual image.

In some or all examples of the first aspect, the manipulation generator is a trained generator network that was trained using low-resolution images as training data.

In some or all examples of the first aspect, the training data includes randomly sampled driving signals to be applied to the low-resolution images.

In some or all examples of the first aspect, the manipulation generator is trained using a loss function that is a weighted sum of adversarial loss, cycle loss, driving loss, refine loss, and warp loss.

In some or all examples of the first aspect, the refine loss is defined as:

$$l_{ref} = |O^w - O'|$$

where |•| is a L1 loss operation between a coarse manipulated image prediction and a refined manipulated image prediction.

In some or all examples of the first aspect, the method further comprises: down-sampling the original high-resolution image to the low-resolution image through one or more intermediate low-resolution images, the at least one intermediate low-resolution image having an intermediate resolution that is less than a high-resolution of the original high-resolution image and greater than a low-resolution of the low-resolution image; computing, from each of the one or more intermediate low-resolution images, an intermediate high-frequency residual image; generating, from each intermediate high-frequency residual image, an intermediate high-frequency manipulated residual image using the motion field; generating, from each intermediate high-frequency manipulated residual image, an intermediate low-frequency manipulated image by up-sampling; and generating an intermediate high-resolution manipulated image using the intermediate high-frequency manipulated residual image and an intermediate low-frequency manipulated image, the intermediate low-frequency manipulated image being generated from an intermediate low-resolution manipulated image from the lower intermediate resolution by up-sampling.

In accordance with another aspect of the present disclosure, there is provided a computing device comprising a processor and a memory, the memory having tangibly stored thereon executable instructions for execution by the processor. The executable instructions, in response to execution by the processor, cause the computing device to perform the methods described above and herein.

In accordance with a further aspect of the present disclosure, there is provided a non-transitory machine-readable storage medium having tangibly stored thereon executable instructions for execution by a processor of a computing device. The executable instructions, in response to execution by the processor, cause the computing device to perform the methods described above and herein.

Other aspects and features of the present disclosure will become apparent to those of ordinary skill in the art upon review of the following description of specific implementations of the application in conjunction with the accompanying figures.

BRIEF DESCRIPTION OF THE DRAWINGS

Reference will now be made, by way of example, to the accompanying drawings which show example embodiments of the present application, and in which:

FIG. 7 shows example pseudocode for implementing the example method of FIG. 6, in accordance with some embodiments of the present disclosure.

DETAILED DESCRIPTION OF EXAMPLE EMBODIMENTS

Figure 1:
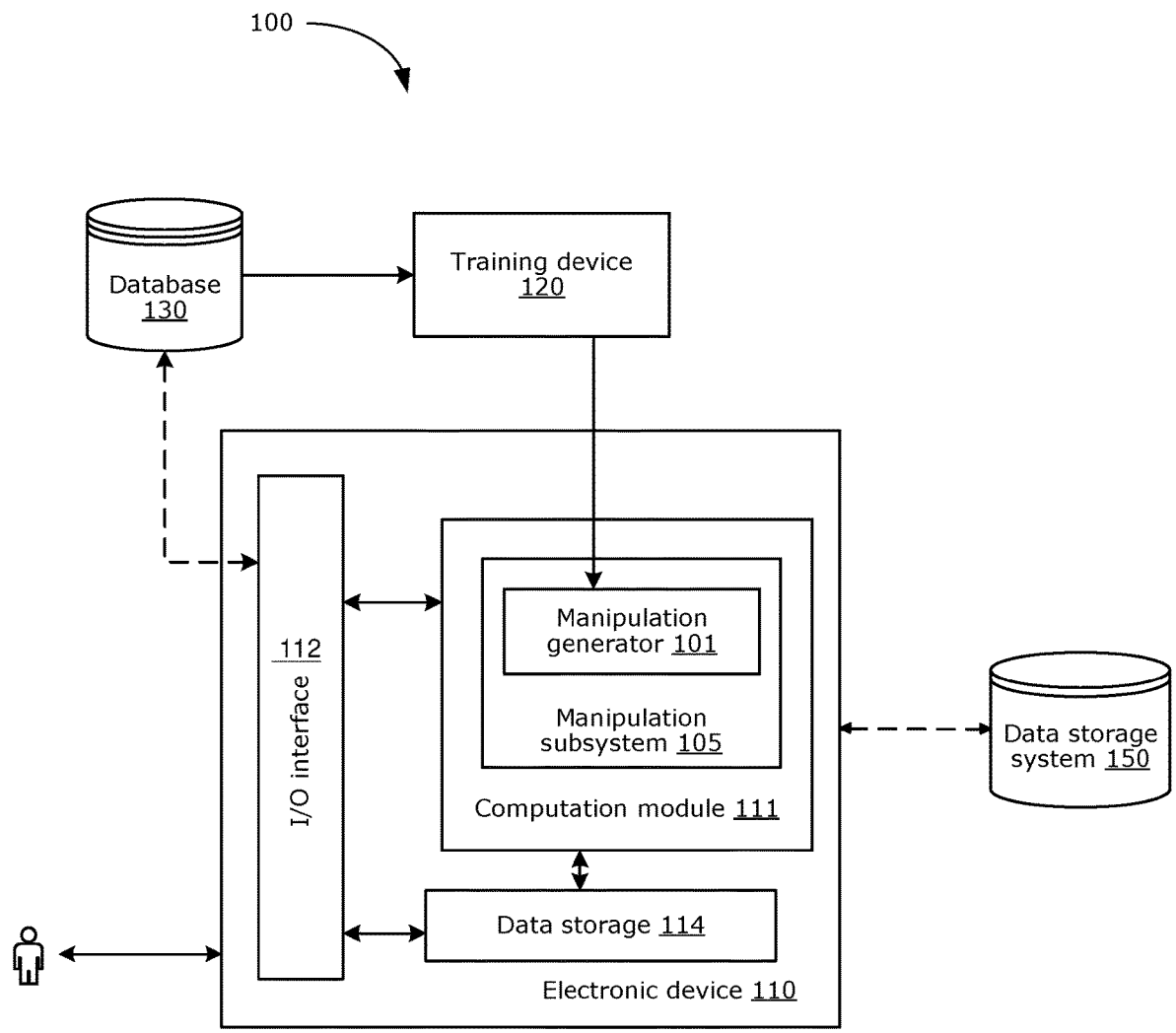
FIG. 1 is a block diagram showing an example system, in accordance with some embodiments of the present disclosure.

The present disclosure is made with reference to the accompanying drawings, in which embodiments of technical solutions are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable storage medium. Lastly, elements referred to in the singular may be plural and vice versa, except where indicated otherwise either explicitly or inherently by context.

The image manipulation methods and systems described in examples herein may be applied to a scenario in which a high-resolution digital image is to be manipulated by the removal or repositioning of an object in the image. For example, a picture depicting a person with a frown may be manipulated to have a smile. The disclosed methods and systems enable a neural network to be trained using lower resolution images, and the trained neural network may then be used for manipulation of a high-resolution image. Thus, the disclosed methods and systems provide the technical effect that a high-resolution image can be manipulated, by the removal and/or repositioning of an object in the image, using a machine learning-based technique, without requiring excessive use of memory resources. A further technical effect is that a high-resolution image can be modified, by the removal or repositioning of an object in the image, using a machine learning-based technique, on a system having limited resources, such as handheld or mobile devices (e.g., a smartphone, a tablet, or a laptop, among others), as well as desktop devices (e.g., desktop computers, or personal computing devices, among others).

The image manipulation methods and systems described in examples herein may also be applied to a scenario in which a 2D image is animated through image manipulation through a plurality of manipulated images to appear to show movement. For example, instead of manipulating a face with a frown to that with a smile, the manipulation could be done by a plurality of images each of which showing a portion of the facial expression manipulation from frown to smile. Each frame of the video may be processed as a high-resolution image, using the disclosed methods and systems. Thus, a technical effect is that high-resolution image manipulation can be used to animate an image or to edit a video.

In the present disclosure, the term "high-resolution" refers to digital images (e.g., photographs or video frames) having a large number of pixels (e.g., 1024×1024 pixels, or more). High-resolution images, in the context of the present disclosure, may thus also be considered to be "high-pixel" images. It should be understood that images having a smaller number of pixels (e.g., 512×152 pixels, or fewer) but having a high density of pixels (e.g., 300 pixels per inch (ppi) or higher) are not necessarily considered to be high-resolution images in the context of the present disclosure.

Conversely, the term "low-resolution" refers to digital images (e.g., photographs or video frames) having a small number of pixels (e.g., 512×512 pixels, or fewer). Low-resolution images, in the context of the present disclosure, may thus also be considered to be "low-pixel" images. It should be understood that images having a larger number of pixels (e.g., 1024×1024 pixels, or more) but having a low density of pixels (e.g., 72 ppi or lower) may be considered high-resolution images rather than low-resolution images, in the context of the present disclosure.

In various examples, the present disclosure describes an approach that may be referred to as Animating-Through-Warping (ATW). In an example disclosed system a neural network model (e.g., a model learned by training a neural network) is provided with a down-sampled (e.g., low-resolution) version of an original high-resolution image to be manipulated. The neural network predicts a low-resolution manipulated image and a motion field, which represents the pixel displacement during the manipulation. The low-resolution manipulated image is then up-sampled to yield a large low-frequency (e.g., blurry) manipulated image. A high-frequency residual image is generated as the difference between the original high-resolution image and the large low-frequency manipulated image. The high-frequency residual image manipulated, using the motion field, to yield a large manipulated high-frequency residual image, which is combined with the large high-resolution manipulated image to obtain a high-resolution manipulated image. Because the neural network is trained on and processes low-resolution images, the cost of memory and computing time is significantly reduced (compared with other neural networks that process high-resolution images directly). Moreover, as the model can be learned using low-resolution images as training data, the need for high-resolution training datasets is alleviated.

In some examples, the present disclosure describes an example method of training a generator network to learn an image manipulation task. The training method relates to processing of computer vision, and specifically, may be applied to a data processing method such as data training, machine learning, or deep learning, to perform symbolic and formalized intelligent information modeling, extraction, preprocessing, training, and the like on training data (such as low-resolution image data in the context of this disclosure), to obtain a trained generator network as discussed further below. In addition, the present disclosure describes an example method for manipulating a high-resolution image, which may be performed using the foregoing trained generator network. In examples discussed herein, input data (such as a low-resolution image down-sampled from an original high-resolution image) is input to the trained generator network, to obtain output data (such as a manipulated low-resolution image, and a motion field). It should be noted that the training method for the generator network and the manipulation method described herein may be considered aspects based on a same idea, or may be considered as two parts of a system or two stages of an entire procedure: for example, a model training stage and a model application stage.

Generally, examples disclosed herein relate to a large quantity of neural network applications. For ease of understanding, the following describes some concepts relevant to neural networks and some relevant terms that may be related to examples disclosed herein.

A neural network consists of neurons. A neuron is a computational unit that uses $x_s$ and an intercept of 1 as inputs. An output from the computational unit may be:

$$h_{W,b}(x) = f(W^T x) = f\left(\sum_{s=1}^{n} W_s x_s + b\right)$$

where s=1, 2, . . . n, n is a natural number greater than 1, $W_s$ is a weight of $x_s$, b is an offset (e.g. bias) of the neuron and f is an activation function of the neuron and used to introduce a nonlinear feature to the neural network, to convert an input of the neuron to an output. The output of the activation function may be used as an input to a neuron of a following convolutional layer in the neural network. The activation function may be a sigmoid function, for example. The neural network is formed by joining a plurality of the foregoing single neurons. In other words, an output from one neuron may be an input to another neuron. An input of each neuron may be associated with a local receiving area of a previous layer, to extract a feature of the local receiving area. The local receiving area may be an area consisting of several neurons.

A deep neural network (DNN) is also referred to as a multi-layer neural network and may be understood as a neural network that includes a first layer (generally referred to as an input layer), a plurality of hidden layers, and a final layer (generally referred to as an output layer). The "plurality" herein does not have a special metric. A layer is considered to be a fully connected layer when there is a full connection between two adjacent layers of the neural network. To be specific, for two adjacent layers (e.g., the i-th layer and the (i+1)-th layer) to be fully connected, each and every neuron in the i-th layer must be connected to each and every neuron in the (i+1)-th layer.

Processing at each layer of the DNN may be relatively straightforward. Briefly, the operation at each layer is indicated by the following linear relational expression: $\vec{y} = \alpha(W\vec{x} + \vec{b})$, where $\vec{x}$ is an input vector, $\vec{y}$ is an output vector, $\vec{b}$ is an offset vector, W is a weight (also referred to as a coefficient), and $\alpha(\bullet)$ is an activation function. At each layer, the operation is performed on an input vector $\vec{x}$, to obtain an output vector $\vec{y}$.

Because there is a large quantity of layers in the DNN, there is also a large quantity of weights W and offset vectors $\vec{b}$. Definitions of these parameters in the DNN are as follows: the weight W is used as an example. In this example, in a three-layer DNN (e.g., a DNN with three hidden layers), a linear weight from a fourth neuron at a second layer to a second neuron at a third layer is denoted as $W_{24}^3$. The superscript 3 indicates a layer (e.g., the third layer (or layer-3) in this example) of the weight W, and the subscript indicates the output is at layer-3 index 2 (e.g., the second neuron of the third layer) and the input is at layer-2 index 4 (e.g., the fourth neuron of the second layer). Generally, a weight from a k-th neuron at an (L−1)-th layer to a j-th neuron at an L-th layer may be denoted as $W_{jk}^L$. It should be noted that there is no W parameter at the input layer.

In a DNN, a greater number of hidden layers may enable the DNN to better model a complex situation (e.g., a real-world situation). In theory, a DNN with more parameters is more complex, has a larger capacity (which may refer to the ability of a learned model to fit a variety of possible scenarios), and indicates that the DNN can complete a more complex learning task. Training of the DNN is a process of learning the weight matrix. A purpose of the training is to obtain a trained weight matrix, which consists of the learned weights W of all layers of the DNN.

A convolutional neural network (CNN) is a DNN with a convolutional structure. The CNN includes a feature extractor consisting of a convolutional layer and a sub-sampling layer. The feature extractor may be considered as a filter. A convolution process may be considered as performing convolution on a 2D input image or a convolutional feature map using a trainable filter.

The convolutional layer is a layer of neurons at which convolution processing is performed on an input in the CNN. In a convolutional layer, one neuron may be connected only to a subset of neurons (e.g., not all neurons) in neighbouring layers. That is, a convolutional layer generally is not a fully connected layer. One convolutional layer usually includes several feature maps, and each feature map may be formed by some neurons arranged in a rectangle. Neurons at a same feature map share weights. The shared weights may be collectively referred to as a convolutional kernel. Typically, a convolutional kernel is a 2D matrix of weights. It should be understood that the convolutional kernel may be unrelated to a manner and position of image information extraction. A hidden principle behind convolutional layers is that statistical information of a part of an image is the same as that of another part of the image. This means that image information learned from one part of the image may also be applicable for another part of the image. A plurality of convolutional kernels may be used at the same convolutional layer to extract different image information. Generally, a larger quantity of convolutional kernels indicates that richer image information is reflected by a convolution operation.

A convolutional kernel may be initialized as a 2D matrix of random values. In a training process of the CNN, the weights of the convolutional kernel are learned. An advantage of using the convolutional kernel to share weights among neurons in the same feature map is that the connections between convolutional layers of the CNN is reduced (compared to the fully connected layer) and the risk of overfitting is lowered.

In the process of training a DNN, a predicted value outputted by the DNN may be compared to a desired target value (e.g., a ground truth value). A weight vector (which is a vector containing the weights W for a given layer) of each layer of the DNN is updated based on a difference between the predicted value and the desired target value. For example, if the predicted value outputted by the DNN is excessively high, the weight vector for each layer may be adjusted to lower the predicted value. This comparison and adjustment may be carried out iteratively until a convergence condition is met (e.g., a predefined maximum number of iterations has been performed, or the predicted value outputted by the DNN is sufficiently converged with the desired target value). A loss function or an objective function is defined, as a way to quantitatively represent how close the predicted value is to the target value. An objective function represents a quantity to be optimized (e.g., minimized or maximized) in order to bring the predicted value as close to the target value as possible. A loss function more specifically represents the difference between the predicted value and the target value, and the goal of training the DNN is to minimize the loss function.

Backpropagation is an algorithm for training a DNN. Backpropagation is used to adjust (also referred to as update) a value of a parameter (e.g., a weight) in the DNN, so that the error (or loss) in the output becomes smaller. For example, a defined loss function is calculated, from forward propagation of an input to an output of the DNN. Backpropagation calculates a gradient of the loss function with respect to the parameters of the DNN, and a gradient algorithm (e.g., gradient descent) is used to update the parameters to reduce the loss function. Backpropagation is performed iteratively, so that the loss function is converged or minimized.

A generative adversarial network (GAN) is a deep learning model, and provides another technique for training a DNN. A GAN includes at least two modules: one module is a generative model (also referred to as a generator), and the other module is a discriminative model (also referred to as a discriminator). These two models compete with each other and learn from each other, so that a better output is generated. The generator and the discriminator may both be neural networks, and may be specifically DNNs, or CNNs.

A basic principle of the GAN is now described, using the example of photo generation. The generator is a network that is learning to perform the task of producing a synthetic photo. The generator receives a random noise z as input, and generates an output, denoted by G(z). The discriminator is a network that is learning to discriminate whether a photo is a real-world photo. The discriminator receives the input x, where x represents a possible photo. An output D(x) generated by the discriminator represents the probability that x is a real-world photo. If D(x) is 1, it indicates that x is absolutely a real-world photo. If D(x) is 0, it indicates that x absolutely is not a real-world photo. In training the GAN, an objective of the generator is to generate a photo as real as possible (to avoid detection by discriminator), and an objective of the discriminator is to try to discriminate between a real-world photo and the photo generated by the generator. Thus, training constitutes a dynamic adversarial process between the generator and the discriminator. The aim of the training is for the generator to learn to generate a photo that the discriminator cannot discriminate from a real-world photo (ideally, D(G(z))=0.5). The trained generator is then used for model application, which is generation of a synthetic photo in this example.

Reference is made to FIG. 1, which shows an example embodiment of the present disclosure as a system architecture 100. The following description shall not be construed as a limitation to any examples of this disclosure. As shown in the system architecture 100, training data may be stored in a database 130. In the context of the present disclosure, training data may include low-resolution images (e.g., images up to size 512×512 pixels, or smaller) which are not necessarily labelled. The database 130 may contain, for example, training datasets that have been previously collected and commonly used for training models related to image tasks (e.g., image recognition). The database 130 may alternatively or additionally contain images optionally collected (e.g., with user consent) from an electronic device 110 (which may be a user device) provided as an execution device. For example, photographs and/or videos captured by and stored on the electronic device 110 may optionally be anonymized and uploaded to the database 130.

As will be discussed further below, training of a manipulation generator 101 may be performed using a training device 120, using the training data maintained in the database 130. The trained manipulation generator 101 may be used to implement a method for manipulation of high-resolution images, according to examples disclosed herein. The training device 120 may use samples of the training data stored in the database 130 to train the manipulation generator 101. Additionally or alternatively, the training device 120 may train the manipulation generator 101 using training data obtained from other sources, such as a distributed storage (or cloud storage platform).

The manipulation generator 101 obtained through training by the training device 120 may be applied to different systems or devices. For example, the manipulation generator 101 may be applied to a manipulation subsystem 105 in a computation module 111 of an electronic device 110. Although FIG. 1 illustrates an example in which the training device 120 is separate from the electronic device 110, it should be understood that the present disclosure is not limited to this embodiment. In some examples, there may not be separate training device 120 and electronic device 110. That is, training of the manipulation generator 101 and application of the trained manipulation generator 101 may be at the same device.

The electronic device 110 may be a user device, for example, a client terminal, a mobile terminal, a tablet computer, a notebook computer, an augmented reality (AR) device, virtual reality (VR) device, or an in-vehicle terminal, among other possibilities. The electronic device 110 may also be a server, a cloud computing platform, or the like, which may be accessed by a user via a user device. In FIG. 1, the electronic device 110 is provided with an I/O interface 112, which is configured to perform data interaction with an external device. For example, the electronic device 110 may provide upload data (e.g., image data, such as photographs and/or videos captured by the electronic device 110) to the database 130 via the I/O interface 112. Although FIG. 1 illustrates an example in which the user directly interacts with the electronic device 110, it should be understood that the present disclosure is not limited to this embodiment. In some examples, there may be a user device separate from electronic device 110, and the user interacts with the user device that in turn communicates data to/from the electronic device 110 via the I/O interface 112.

The electronic device 110 in this example includes a data storage 114, which may be a system memory (e.g., a random access memory (RAM), a read-only memory (ROM), etc.) or a mass storage device (e.g., a solid state drive, a hard disk drive, etc.). The data storage 114 may store data accessible by the computation module 111. For example, the data storage 114 may store captured images and/or manipulated images on the electronic device 110, separately from the computation module 111.

In some examples, the electronic device 110 may optionally invoke data, code, or the like from an external data storage system 150, to perform processing, or may store, in the data storage system 150, data, an instruction, or the like obtained through corresponding processing.

It should be noted that FIG. 1 is merely a schematic diagram of an example system architecture 100 according to an embodiment of the present disclosure. Relationships and interactions between the device, the component, the module, and the like that are shown in FIG. 1 are not intended to be limiting to the present disclosure.

Figure 2:
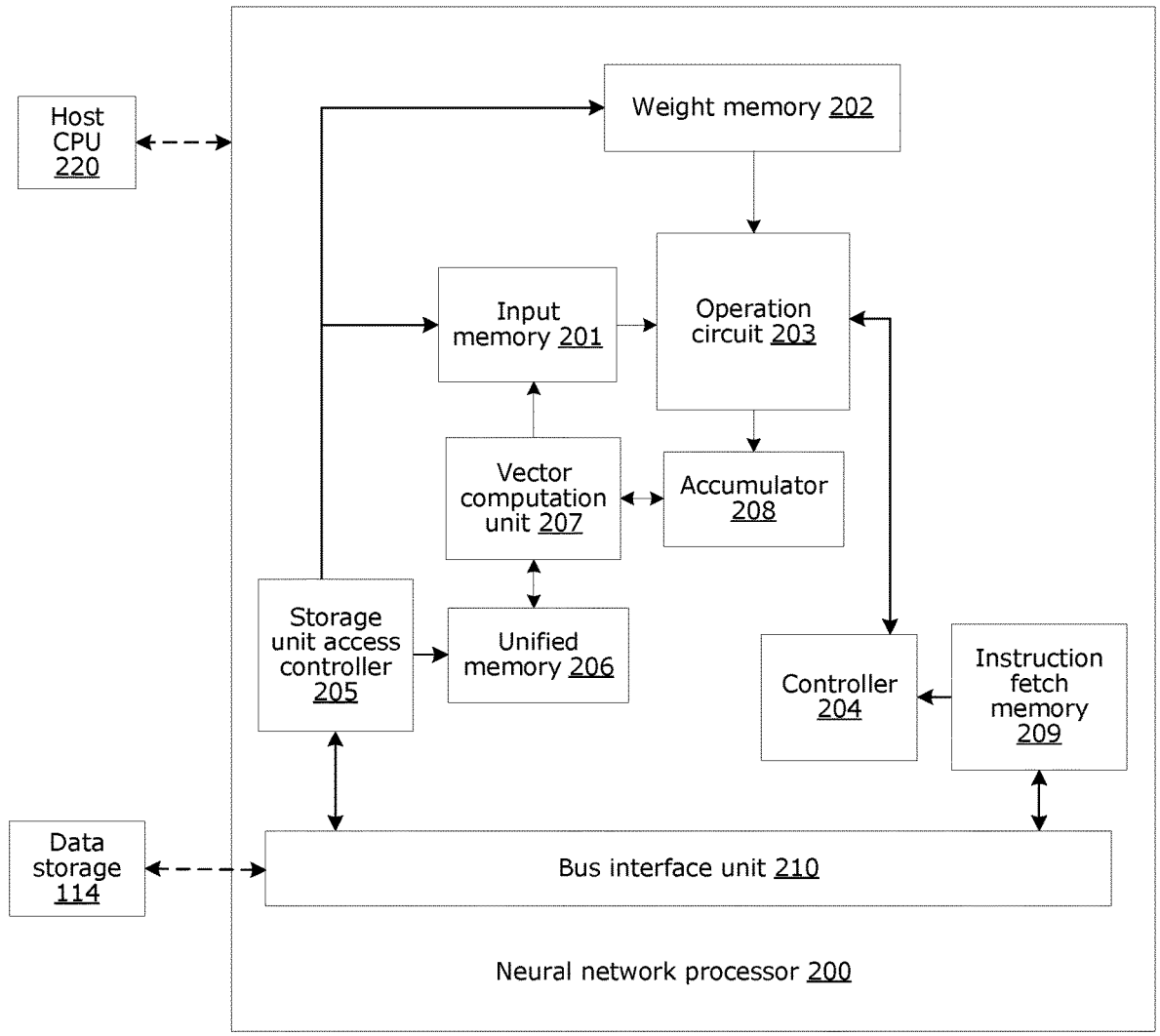
FIG. 2 is a block diagram illustrating an example hardware structure for a neural network processor, in accordance with some embodiments of the present disclosure.

FIG. 2 is a block diagram illustrating an example hardware structure of an example neural network processor 200 according to an embodiment of the present disclosure. The neural network processor 200 may be provided on an integrated circuit (also referred to as a computer chip). The neural network processor 200 may be provided in the electronic device 110 shown in FIG. 1, to perform computation for the computation module 111 and to implement the manipulation subsystem 105. Additionally or alternatively, the neural network processor 200 may be provided in the training device 120 shown in FIG. 1, to perform training of the manipulation generator 101. All the algorithms of the layers of a neural network (e.g., the neural network in the manipulation generator 101, discussed further below) may be implemented in the neural network processor 200.

The neural network processor 200 may be any processor that is capable of performing the computations required in a neural network (e.g., to compute massive exclusive OR operations). For example, the neural network processor 200 may be a neural processing unit (NPU), a tensor processing unit (TPU), a graphics processing unit (GPU), or the like. The neural network processor 200 may be a coprocessor to an optional host central processing unit (CPU) 220. For example, the neural network processor 200 and the host CPU 220 may be mounted on the same package. The host CPU 220 may be responsible for performing core functions of the electronic device 110 (e.g., execution of an operating system (OS), managing communications, etc.). The host CPU 220 may manage operation of the neural network processor 200, for example by allocating a task to the neural network processor 200.

The neural network processor 200 includes an operation circuit 203. A controller 204 of the neural network processor 200 controls the operation circuit 203 to, for example, extract data (e.g., matrix data) from an input memory 201 and a weight memory 202 of the neural network processor 200, and perform data operations (e.g., addition and multiplication operations).

In some examples, the operation circuit 203 internally includes a plurality of processing units (also referred to as process engines (PEs)). In some examples, the operation circuit 203 is a bi-dimensional systolic array. In other examples, the operation circuit 203 may be a uni-dimensional systolic array or another electronic circuit that can implement a mathematical operation such as multiplication and addition. In some examples, the operation circuit 203 is a general matrix processor.

In an example operation, the operation circuit 203 obtains, from the weight memory 202, weight data of a weight matrix B, and caches the weight data in each PE in the operation circuit 203. The operation circuit 203 obtains, from the input memory 201, input data of an input matrix A and performs a matrix operation based on the input data of the matrix A and the weight data of the matrix B. An obtained partial or final matrix result is stored in an accumulator 208 of the neural network processor 200.

In this example, the neural network processor 200 includes a vector computation unit 207. The vector computation unit 207 includes a plurality of operation processing units. If needed, the vector computation unit 207 performs further processing, for example, vector multiplication, vector addition, an exponent operation, a logarithm operation, or magnitude comparison, on an output from the operation circuit 203 (which may be retrieved by the vector computation unit 207 from the accumulator 208). The vector computation unit 207 may be mainly used for computation at a non-convolutional layer or fully-connected layer of a neural network. For example, the vector computation unit 207 may perform processing on computation such as pooling or normalization. The vector computation unit 307 may apply a nonlinear function to an output of the operation circuit 203, for example, a vector of an accumulated value, to generate an activation value, which may be used by the operation circuit 203 as activation input for a next layer of a neural network. In some examples, the vector computation unit 207 generates a normalized value, a combined value, or both a normalized value and a combined value.

The neural network processor 200 in this example includes a storage unit access controller 205 (also referred to as a direct memory access control (DMAC)). The storage unit access controller 205 is configured to access a memory external to the neural network processor 200 (e.g., the data storage 114 of the electronic device 110) via a bus interface unit 210. The storage unit access controller 205 may access data from the memory external to the neural network processor 200 and transfer the data directly to one or more memories of the neural network processor 200. For example, the storage access unit controller 205 may directly transfer weight data to the weight memory 202, and may directly transfer the input data to a unified memory 206 and/or the input memory 201. The unified memory 206 is configured to store input data and output data (e.g., a processed vector from the vector computation unit 207).

The bus interface unit 210 is also used for interaction between the storage access unit controller 205 and an instruction fetch memory (also referred to as an instruction fetch buffer) 209. The bus interface unit 210 is further configured to enable the instruction fetch memory 209 to obtain an instruction from a memory external to the neural network processor 200 (e.g., the data storage 114 of the electronic device 110). The instruction fetch memory 209 is configured to store the instruction for use by the controller 204.

Generally, the unified memory 206, the input memory 201, the weight memory 202, and the instruction fetch memory 209 are all memories of the neural network processor 200 (also referred to as on-chip memories). The data storage 114 is independent from the hardware architecture of the neural network processor 200.

Figure 3:
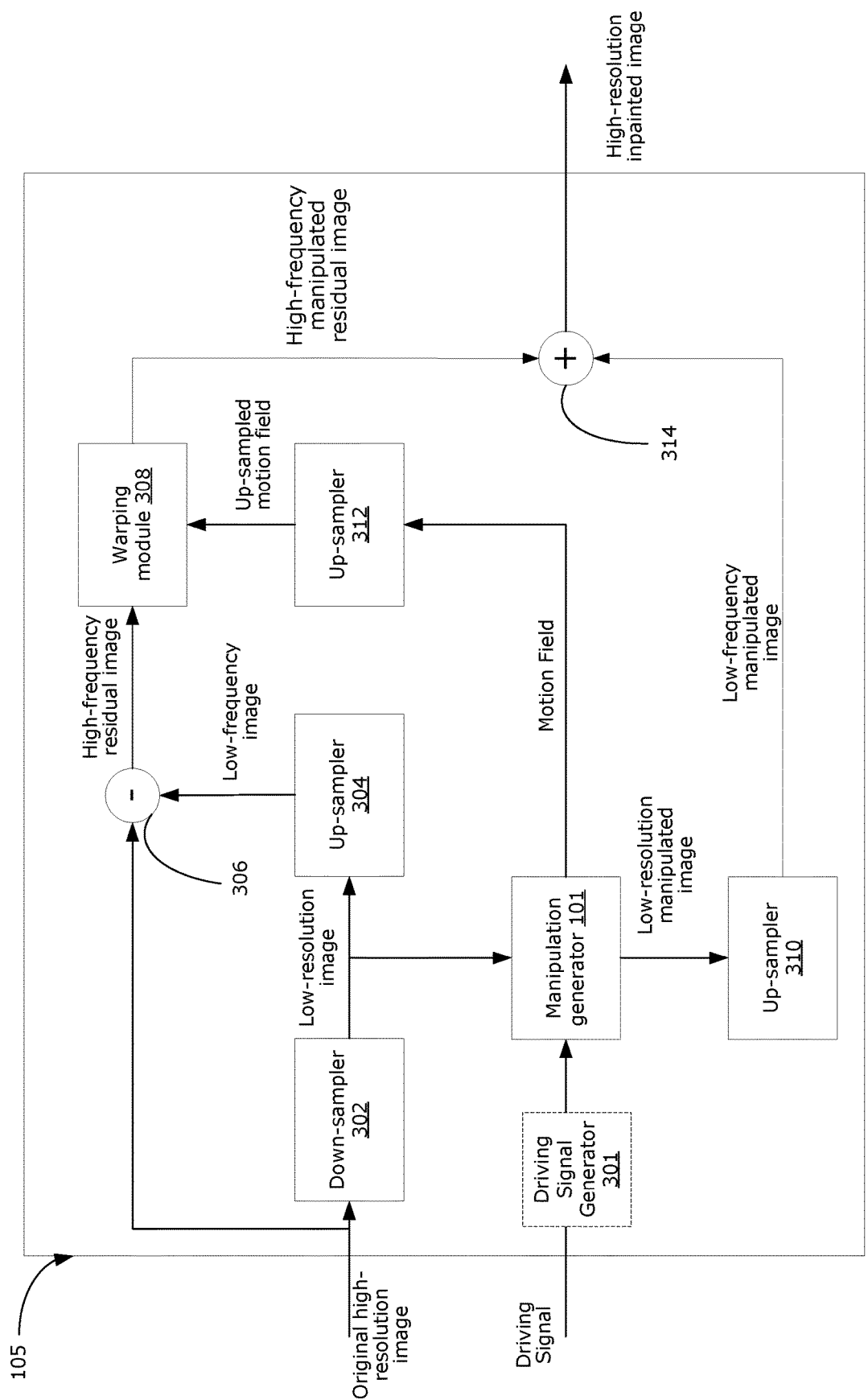
FIG. 3 is a block diagram illustrating an example of high-resolution image manipulation using a trained manipulation generator, in accordance with some embodiments of the present disclosure.

FIG. 3 is a block diagram illustrating operations for manipulation of a high-resolution image, performed by the manipulation subsystem 105 according to an embodiment of the present disclosure. The manipulation subsystem 105 includes the manipulation generator 101, which is trained (e.g., using the training device 120) as discussed further below.

The manipulation subsystem 105 receives an original high-resolution image as an input. The original high-resolution image may, for example, be a photograph or video frame(s) captured by the electronic device 110. The original high-resolution image may have a resolution of 1024×1024 pixels, up to 4K resolution, or higher, for example. The manipulation subsystem 105 also receives a driving signal as an input. The driving signal represents a desired manipulation of the image. By way of a non-limiting example, in embodiments in which the image to be manipulated is an image of a human face, the driving signal may be a one-dimensional vector comprised of numerical values of one or more action units (AU's) describing facial muscle movements as defined by the Facial Action Coding System (FACS). For example, fear is given by—inner brow raiser (AU1), outer brow raiser (AU2), brow lowerer (AU4), upper lid raiser (AU5), lid tightener (AU7), lip stretcher (AU20) and jaw drop (AU26). Hence, the driving signal for the desired manipulation of fear may be defined as [0.3, 0.19, 0, 0.02, 0, 1.73, 0.56, 0.96, 0, 0, 0.03, 0, 0.63, 0, 0.75, 2.11, 0], where a value of 0 indicates an absence of that AU, while a positive number indicates the magnitude of activation of an AU. In further examples, the driving signals could be derived from a driving input by an optional driving signal generator 301. The driving input could be an image of a similar object containing the desired result. For example, for facial feature manipulation, the driving signal could be provided in the form of an image containing the desired facial feature. The facial image in the driving signal need not to be the same facial image as the one to be manipulated. In such cases, a driving signal generator, such as OpenFace for estimating AU's, may be used to estimate an AU corresponding to the driving input image and provide the estimated AU as the driving signal. In some further examples, the driving signal may be a phrase descriptive of the desired manipulation result. For example, the driving signal could be "smile", indicative of the desired facial manipulation result. In such embodiments, the driving signal generator may convert the input phrase to a set of corresponding AU's as the driving signal.

The manipulation subsystem 105 is configured to, at a down-sampler operation 302, down-sample the inputted original high-resolution image to generate a low-resolution image (e.g., 512×512 pixels, or smaller). The down-sampler operation 302 may be performed using any suitable down-sampling technique, such as nearest-neighbor down-sampling, bilinear down-sampling, bicubic down-sampling or averaging down-sampling. In some examples, the down-sampler operation 302 may be performed using averaging, which evenly divides the original high-resolution image into equal-sized regions (each equal-sized region corresponding to a respective pixel of the low-resolution image generated by the down-sampling) and averages all pixels in each region to obtain a pixel value for the corresponding pixel of the low-resolution image.

The low-resolution image is up-sampled, at a first up-sampler operation 304, to generate a low-frequency (e.g., blurry) image of the same pixel size and dimension (i.e., same resolution) as the original high-resolution image. The first up-sampler operation 304 may be performed using any suitable up-sampling technique, such as nearest-neighbor up-sampling, bilinear up-sampling, or bicubic up-sampling. In some examples, the first up-sampler operation 304 may be performed using bilinear up-sampling.

The up-sampled low-frequency image is pixel-wise subtracted from the original high-resolution image, at a subtraction operation 306, to obtain a high-frequency residual image. The high-frequency residual image may be a 2D matrix that has dimensions corresponding to the dimensions of the original high-resolution image (e.g., the high-frequency residual image may be a 2D image having the same pixel size and dimension as the original high-resolution image). Each pixel in the high-frequency residual image corresponds to a respective pixel in the original high-resolution image. The high-frequency residual image contains the high-frequency component of the original high-resolution image. The high-frequency residual image provides high-frequency information that was lost in the down-sampling and up-sampling operation.

The low-resolution image is also received by the manipulation generator 101, the details of which are discussed further below. The manipulation generator 101 generates a low-resolution manipulated image and predicts a motion field. The predicted motion field indicates the horizontal and vertical displacement of each pixel between the in the low-resolution image and the low-resolution manipulated image. The motion field is of the same resolution as the low-resolution image. The motion field may be considered to provide contextual manipulation information across the entire low-resolution image.

The low-resolution manipulated image from the manipulation generator 101 is up-sampled, by a second up-sampler operation 310, to generate a low-frequency manipulated image. The low-frequency manipulated image has the same resolution as the original high-resolution image. The second up-sampler operation 310 should perform up-sampling using the same technique as the first up-sampler operation 304 (e.g., both using bilinear up-sampling).

The motion field predicted by the manipulation generator 101 is also up-sampled, by a third up-sampler operation 312, to generate an up-scaled motion field. The up-scaled motion field has the same resolution as the original high-resolution image. The third up-sampler operation 312 should also perform up-sampling using the same technique as the first and second up-sampler operation 304 (e.g., all using bilinear up-sampling).

The up-scaled motion field from the manipulation generator 101 and the high-frequency residual image from the subtraction operation 306 are received by a warping module 308. The warping module 308 applies the pixel displacement in the up-scaled motion field to the high-frequency residual image to compute an high-frequency manipulated residual image, which contains high-frequency residual information with pixel displacement that generally reflect that of the low-resolution manipulated image. Further details about the motion field and the warping module 308 are provided below.

The high-frequency manipulated residual image is added to the up-scaled low-frequency manipulated image, at an addition operation 314, resulting in a high-resolution manipulated image. The resolution of the high-resolution manipulated image, which is the output from the manipulation subsystem 105, is the same as that of the original high-resolution image. The high-frequency manipulated image may be provided to be displayed to a user of the electronic device 110 and/or stored in the data storage 114 of the electronic device 110, for example.

The manipulation subsystem 105 may be understood to extrapolate the pixel displacement information from manipulation of a low-resolution image and apply it to high-frequency residuals of a high-resolution image, to enable high-resolution manipulation of the residual pixels. In this way, the residual pixels are displaced in a similar fashion as that of the low-resolution image without the need to process large number of pixels through the trained model.

Figure 4:
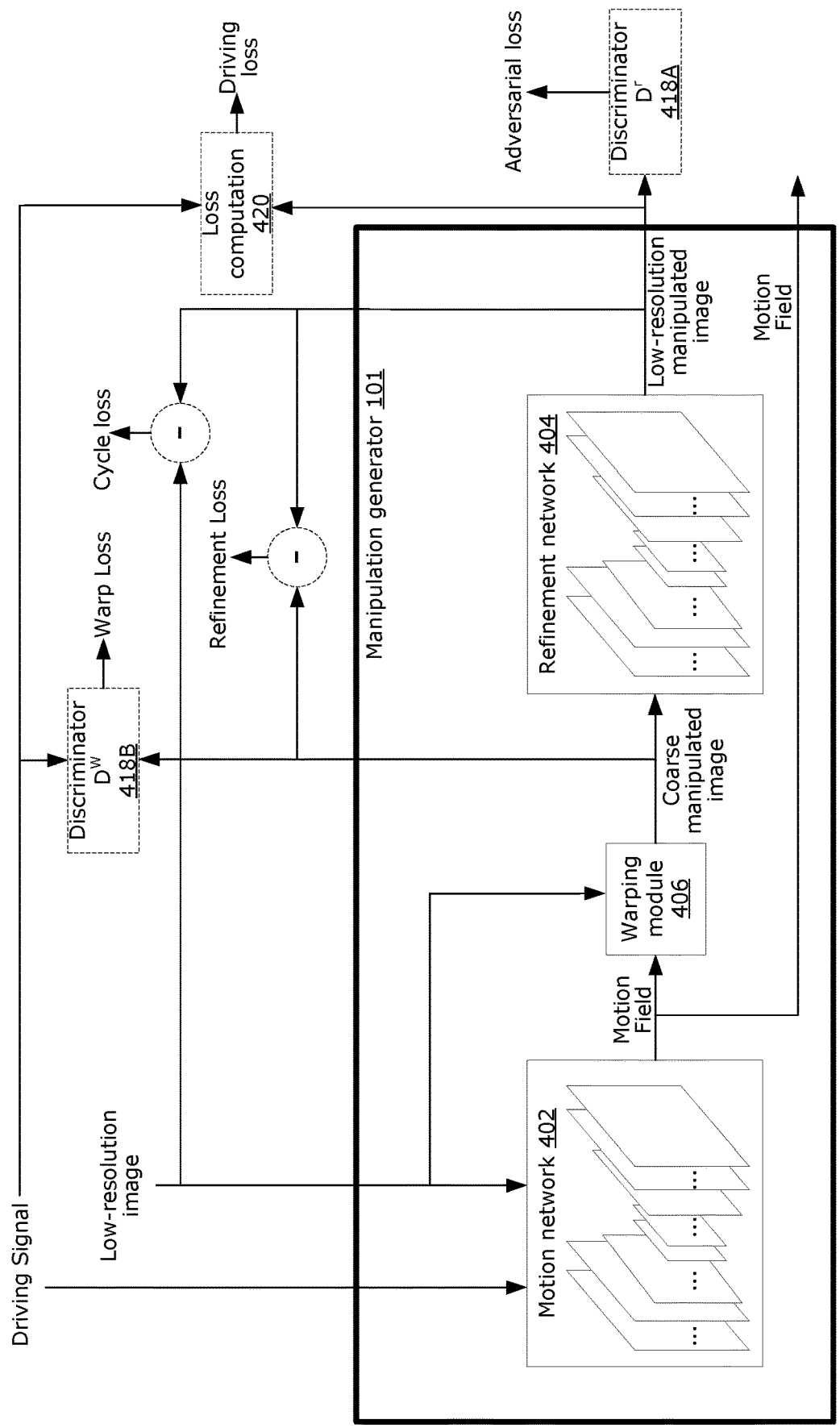
FIG. 4 illustrates some implementation details of an example manipulation generator, in accordance with some embodiments of the present disclosure.

FIG. 4 illustrates details of an example manipulation generator 101 for generating a low-resolution manipulation image, according to an embodiment of the present disclosure.

The manipulation generator 101 is based on a two-stage coarse-to-fine framework including a motion network 402 that predicts a motion field, with which the low-resolution image is warped to generate a coarse manipulated low-resolution output, and a refinement network 404 that refines the coarse manipulated output to generate the low-resolution manipulated image that is ultimately outputted by the manipulation generator 101. The two networks of the manipulation generator 101 may be understood as the motion network 402 predicts a motion field that could warp the low-resolution image to the desired status defined by the driving signal, and the refinement network 404 refines a coarse image generated from warping to suppress noise and artifacts, preserve color consistency, making the resulting image more visually realistic. In this example, both the motion network 402 and the refinement network 404 have respective encoder-decoder CNN architectures. In some example embodiments, the input image is convolved and down-sampled twice, processed by bottleneck layers and then deconvolved and up-sampled twice to the original size. The bottleneck layers may be made up of several residual blocks (e.g., 6 residual blocks for the motion network and 4 for the refinement network).

Inputs to the manipulation generator 101 are the low-resolution image (from the down-sampler 302 in FIG. 3) and the driving signal (which is part of the input to the manipulation subsystem 105. The resolution (in terms of pixel size and dimension) of the output low-resolution manipulated image is the same as that of the input low-resolution image. For example, if the input low-resolution image has a resolution of 128×128 pixels, then the output low-resolution manipulated image also has a resolution of 128×128 pixels. In some embodiments, the driving signal could be provided by an optional driving signal generator which generates the driving signal from a driving input, such as an image containing the desired manipulation result or a phrase that could be converted to a suitable driving signal (e.g., AU).

The operation of the motion network 402 is described first. In some embodiments, the driving signal is a vector that defines the desired manipulation, which may be expressed in various forms including expression categories and/or AU's. The driving signal is repeated and tiled to match the dimensions of the low-resolution image. For example, for a 128×128-pixel low-resolution image, the driving signal may be repeated and tiled to 128×128×d, where d is the number of dimensions of the driving signal prior to being concatenated to the low-resolution image. In some embodiments, the motion network 402 is of an encoder-decoder CNN architecture. In order to generate more semantic feature maps at the motion network 402, the low-resolution image is convolved and further down-sampled, to even lower resolution feature maps (e.g., 64×64 pixels, or smaller). In some embodiments, the feature maps may be down-sampled more than once (e.g., twice or more). The down-sampling operation may be performed using any suitable down-sampling technique, as discussed above. For example, the down-sampling operation may use the same technique as the first down-sampler operation 302 previously described. The output of the down-sampler operation is provided as input to the motion network 402 and processed by a plurality of bottleneck layers that predicts a motion field required to manipulate the input to generate the desired manipulation result indicated in the driving signal. The motion field may be a matrix of the same resolution as the low-resolution image, where each matrix value of the motion field is representative of the horizontal and vertical displacement of each pixel in the low-resolution image in order to produce the desired result indicated in the driving signal. The output of the motion network 402 is up-sampled and deconvolved, to provide a coarse output. The up-sampling operation is performed so that the coarse manipulated output matches the resolution (e.g., 128×128 pixels) of the low-resolution image that was inputted to the manipulation generator 101. The up-sampling operation may use any suitable up-sampling technique, as discussed above. For example, the up-sampling operation may use the same technique as the first and second up-sampler operations 304, 310 previously described. The coarse output from the motion network 402 then undergoes a warping operation, by a warping module 406, where the pixels of the coarse image is displaced, in accordance with the displacement values indicated in the motion field, to generate a coarse manipulated output that is fed to the refinement network 404.

In some embodiments, the last layer of the motion network 402 is bounded by a tan h activation function to limit the output of the layers bounded within [−1, 1] as opposed to leaving the layer unbounded. A factor is then multiplied to the estimated motion values to adapt to specific image sizes. Each layer of the motion network 402 may use instance normalization and Rectified Linear Unit (ReLU) activation function.

The coarse manipulated output is provided as input to the refinement network 404. In some embodiments, the refinement network 404 is also of an encoder-decoder CNN architecture where the input, namely the coarse manipulated image, is convolved and further down-sampled, to even lower resolution feature maps (e.g., 64×64 pixels, or smaller). In some embodiments, the feature maps may be down-sampled more than once (e.g., twice or more). The down-sampling operation may be performed using any suitable down-sampling technique, as discussed above. For example, the down-sampling operation may use the same technique as the first down-sampler operation 302 previously described. The output of the down-sampler operation is processed by a plurality of bottleneck layers. The refinement layer learns to improve the coarse initial output in a data-driven manner. The refinement layer may comprise a neural network. The initial output always contains some artifacts. In a data-driven manner, the refinement network automatically learns how to improve the initial output results. The output of the bottleneck layers of the refinement network 404 is up-sampled and deconvolved, to provide a low-resolution manipulated image. The up-sampling operation is performed so that the coarse manipulated output matches the resolution (e.g., 128×128 pixels) of the low-resolution image that was inputted to the manipulation generator 101. The up-sampling operation may use any suitable up-sampling technique, as discussed above. For example, the up-sampling operation may use the same technique as the first and second up-sampler operations 304, 310 previously described.

In some embodiments, each layer of the refinement network 404 uses Exponential Linear Unit (ELU) with no normalization layer to preserve color consistency between the coarse manipulated image and the low-resolution manipulated image, as ReLU and normalization layers are found to deteriorate color consistency. Pixel values of all images processed by the refinement network 404 are within range of [−1, 1].

Figure 5:
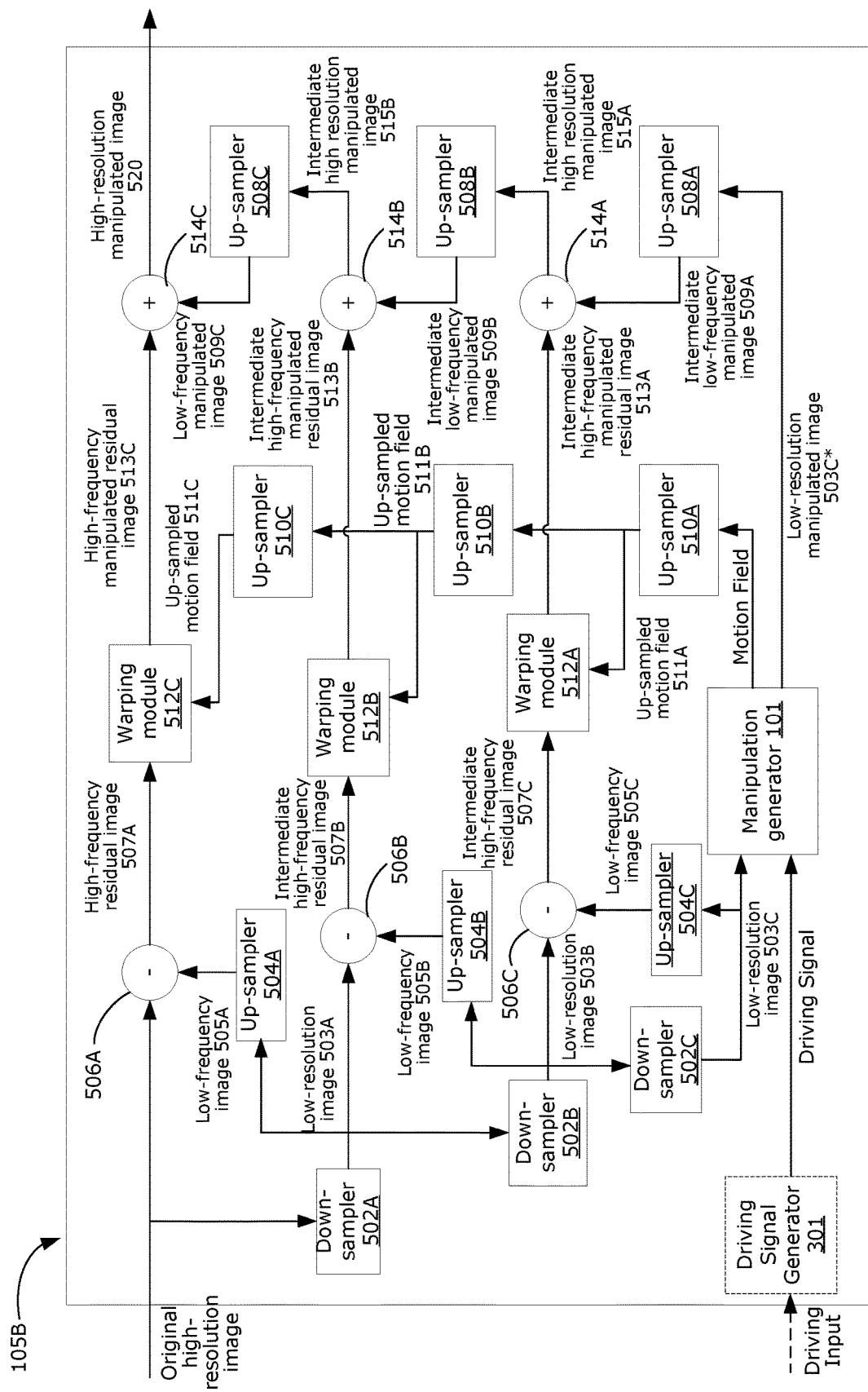
FIG. 5 is a block diagram illustrating another example of high-resolution image manipulation using a trained manipulation generator, in accordance with some embodiments of the present disclosure.

FIG. 5 is a block diagram illustrating operations for manipulation of a high-resolution image, performed by the manipulation subsystem 105B according to another embodiment of the present disclosure. The manipulation subsystem 105B of FIG. 5 is a variation of the manipulation subsystem 105 of FIG. 3.

In the manipulation subsystem 105B of FIG. 5, the decomposition of the original high-resolution image follows the Laplacian Pyramid in which the decomposition of the original high-resolution image is performed in a plurality of down-sampling steps resulting in a pyramid of scale-disentangled representations (e.g., band-pass images octaves apart with a corresponding number of residual images). As the original high-resolution image is successively down-sampled, the down-sampled image at each stage generates a corresponding residual image. The lowest resolution image is provided as input to the manipulation generator 101 to generate a lowest-resolution manipulated image and a predicated motion field. The lowest-resolution image and the motion field are then successively up-sampled. At each up-sampling stage, the up-sampled low-frequency image is added to a warped high-frequency residual image of the same resolution generated from the residual image produced at the corresponding down-sampling stage being warped with an up-sampled motion field. The up-sampling and combining with high-frequency manipulated image is recursively continued until the manipulated image is restored to the same resolution as the original high-resolution image. It should be understood that aside from the differences specifically mentioned above, the details of the manipulation subsystem 105B of FIG. 5 may be substantially the same as the manipulation subsystem 105 of FIG. 3. It should be further understood that although three stages of down-sampling/up-sampling stages are shown, they are intended to be illustrative of an exemplary embodiment and not limiting. The number of down-sampling and the corresponding up-sampling stages may vary from two to a plurality depending on factors such as resolution of the original high-resolution image, available computational resources, etc.

The manipulation subsystem 105B receives an original high-resolution image as an input. The original high-resolution image may be, for example, a photograph or video frame(s) captured by the electronic device 110. The original high-resolution image may have an original resolution of R. The original resolution R of the original high-resolution image may be 1024×1024 pixels, up to 4K resolution, or higher, for example. The manipulation subsystem 105B also receives a driving signal as an input. The driving signal represents a desired manipulation of the image. The driving signal may contain an Action Unit (AU) defining a desired manipulation result or may be generated by the driving signal generator 301 as described with respect to FIG. 3 from a driving signal.

The manipulation subsystem 105B is configured to, at a down-sampler operation 502A, down-sample the inputted original high-resolution image to generate a first low-resolution image 503A having a resolution of R/n, where n is a down-sampling factor. Instead of down-sampling the original high-resolution image to the lowest resolution image inputted into the manipulation generator 101 like in manipulation subsystem 105, the original high-resolution image is incrementally down-sampled. By way of a non-limiting example, an original high-resolution image of 1024×1024 pixels may be down-sampled by a factor of 2 (n=2) to a 512×512 pixels low resolution image following the down-sampler operation 502A. The down-sampler operation 502A may be performed using any suitable down-sampling technique, such as nearest-neighbor down-sampling, bilinear down-sampling, bicubic down-sampling or averaging down-sampling. In some examples, the down-sampler operation 502A may be performed using averaging, which evenly divides the original high-resolution image into equal-sized regions (each equal-sized region corresponding to a respective pixel of the first low-resolution image 503A generated by the down-sampling) and averages all pixels in each region to obtain a pixel value for the corresponding pixel of the first low-resolution image 503A.

The first low-resolution image 503A is up-sampled, at an up-sampler operation 504A, to generate a first low-frequency (e.g., blurry) image 505A of the same resolution as the original high-resolution image, a resolution of R. The up-sampler operation 504A may be performed using any suitable up-sampling technique, such as nearest-neighbor up-sampling, bilinear up-sampling, or bicubic up-sampling. In some examples, the up-sampler operation 504A may be performed using bilinear interpolation.

The up-sampled first low-frequency image 505A is pixel-wise subtracted from the original high-resolution image, at a subtraction operation 506A, to obtain a first high-frequency residual image 507A of resolution R. The high-frequency residual image may be a 2D matrix that has dimensions corresponding to the dimensions of the original high-resolution image (e.g., the high-frequency residual image may be a 2D image having the same resolution as the original high-resolution image). Each pixel in the first high-frequency residual image 507A corresponds to a respective pixel in the original high-resolution image. The first high-frequency residual image 507A contains the high-frequency component of the original high-resolution image. The first high-frequency residual image 507A provides high-frequency information that was lost in the down-sampling and up-sampling operations 502A and 504A. The first high-frequency residual image 507A may be temporarily stored in memory or cache in data storage 114.

At a down-sampler operation 502B, the first low-resolution image 503A is further down-sampled to generate a second low-resolution image 503B having a resolution of $R/n^2$. By way of a non-limiting example, an original high-resolution image having a resolution of 1024×1024 pixels that has been down-sampled to a first low-resolution image 503A having a resolution of 512×512 pixels may be further down-sampled to a second low-resolution image 503B having a resolution of 256×256 pixels following the down-sampler operation 502B. The down-sampler operation 502B may be performed using the same technique as the down-sampler operation 502A (e.g., both using neighbor averaging).

The second low-resolution image 503B is up-sampled, at an up-sampler operation 504B, to generate a second low-frequency (e.g., blurry) image 505B of the same resolution as the first low-resolution image 503A, a resolution of R/2. The up-sampler operation 504B may be performed using the same technique as the up-sampler operation 504A (e.g., both using bilinear interpolation).

The up-sampled second low-frequency image 505B is pixel-wise subtracted from the low resolution-image 503A, at a subtraction operation 506B, to obtain a first intermediate high-frequency residual image 507B of resolution R/2. The first immediate high-frequency residual image 507B may be a 2D matrix that has dimensions corresponding to the dimensions of the first low-resolution image 503A (e.g., the high-frequency residual image may be a 2D image having the same resolution as the first low-resolution image 503A). Each pixel in the first intermediate high-frequency residual image 507B corresponds to a respective pixel in the first low-resolution image 503A. The first intermediate high-frequency residual image 507B contains the high-frequency component of the first low-resolution image 503A. The first intermediate high-frequency residual image 507B provides high-frequency information that was lost in the down-sampling and up-sampling operations 502B and 504B. The first intermediate high-frequency residual image 507B may be temporarily stored in memory or cache in data storage 114.

At a down-sampler operation 502C, the second low-resolution image 503B is further down-sampled to generate a third low-resolution image 503C having a resolution of $R/n^3$. By way of a non-limiting example, an original high-resolution image having a resolution of 1024×1024 pixels that has been down-sampled to a first low-resolution image 503A having a resolution of 512×512 pixels may be further down-sampled to a second low-resolution image 503B of 256×256 pixels following the down-sampler operation 502B may be further down-sampled to 128×128 pixels following the down-sampler operation 502C. The down-sampler operation 502C may be performed using the same technique as the down-sampler operations 502A and 502B (e.g., using neighbor averaging).

The third low-resolution image 503C is up-sampled, at an up-sampler operation 504C, to generate a third low-frequency (e.g., blurry) image 505C of the same resolution as the second low-resolution image 503B, a resolution of $R/n^3$. The up-sampler operation 504C may be performed may be performed using the same technique as the up-sampler operations 504A and 504B (e.g., using bilinear interpolation).

The up-sampled third low-frequency image 505C is pixel-wise subtracted from the low resolution-image 503B, at a subtraction operation 506C, to obtain a second intermediate high-frequency residual image 507C of resolution $R/n^3$. The second intermediate high-frequency residual image 507C may be a 2D matrix that has dimensions corresponding to the dimensions of the second low-resolution image 503B (e.g., the high-frequency residual image may be a 2D image having the same resolution as the second low-resolution image 503B). Each pixel in the second intermediate high-frequency residual image 507C corresponds to a respective pixel in the second low-resolution image 503B. The second intermediate high-frequency residual image 507C contains the high-frequency component of the second low-resolution image 503B. The second intermediate high-frequency residual image 507C provides high-frequency information that was lost in the down-sampling and up-sampling operations 502C and 504C.

The third low-resolution image 503C, along with the driving signal, are received by the manipulation generator 101. The manipulation generator 101 generates a low-resolution manipulated image 503C* and predicts a motion field, both having a resolution of $R/n^3$. The low-resolution manipulated image 503C* is of the same resolution as the third low-resolution image 503C, $R/n^3$. The predicted motion field indicates the horizontal and vertical displacement of each pixel between the third low-resolution image 503C and the low-resolution manipulated image. The motion field is of the same resolution as the third low-resolution image 503C, $R/n^3$. The motion field may be considered to provide contextual manipulation information across the entire third low-resolution image 503C.

The low-resolution manipulated image 503C* from the manipulation generator 101 is up-sampled, by an up-sampler operation 508A, to generate a first intermediate low-frequency manipulated image 509A. The first intermediate low-frequency manipulated image 509A has the same resolution as the second low-resolution image 503B, a resolution of $R/n^2$ (e.g., up-scaled from 128×128 pixels to 256×256 pixels). The up-sampler operation 508A should perform up-sampling using the same technique as the up-sampler operations 504A, 504B, and 504C, collectively referred to as up-sampler operations 504 (e.g., using bilinear up-sampling).

The motion field predicted by the manipulation generator 101 is also up-sampled, by an up-sampler operation 510A, to generate an up-scaled motion field 511A. The up-scaled motion field 511A has the same resolution as the second low-resolution image 503B, a resolution of $R/n^2$ (e.g., 256× 256 pixels following the same example as above). The up-sampler operation 510A should also perform up-sampling using the same technique as the up-sampler operations 504 (e.g., using bilinear up-sampling).

The up-scaled motion field 511A and the second intermediate high-frequency residual image 507C from the subtraction operation 506C are received by a warping module 512A. The warping module 512A applies the pixel displacement in the up-scaled motion field 511A to the second intermediate high-frequency residual image 507C to compute a first intermediate high-frequency manipulated residual image 513A having a resolution of $R/n^2$, which contains high-frequency residual information with pixel displacement that generally reflect that of the low-resolution manipulated image.

The first intermediate high-frequency manipulated residual image 513A is added to the up-scaled first intermediate low-frequency manipulated image 509A, at an addition operation 514A, resulting in a first intermediate resolution manipulated image 515A. The resolution of the first intermediate resolution manipulated image 515A is the same as that of the second low-resolution image 503B, a resolution of $R/n^2$ (e.g., 256×256 pixels following the same example as above).

The first intermediate resolution manipulated image 515A is up-sampled, by an up-sampler operation 508B, to generate a second intermediate low-frequency manipulated image 509B. The second intermediate low-frequency manipulated image 509B has the same resolution as the first low-resolution image 503A, a resolution of $R/n$ (e.g., up-scaled from 256×256 pixels to 512×512 pixels following the same example above). The up-sampler operation 508B should perform up-sampling using the same technique as the up-sampler operations 508A and 504 (e.g., using bilinear up-sampling).

The up-scaled motion field 511A is further up-sampled, by an up-sampler operation 510B, to generate an up-scaled motion field 511B. The up-scaled motion field 511B has the same resolution as the first low-resolution image 503A, a resolution of $R/n$. The up-sampler operation 510B should also perform up-sampling using the same technique as the up-sampler operations 504 and 510A (e.g., using bilinear up-sampling).

The up-scaled motion field 511B and the first intermediate high-frequency residual image 507B from the subtraction operation 506B are received by a warping module 512B. The warping module 512B applies the pixel displacement in the up-scaled motion field 511B to the first intermediate high-frequency residual image 507B to compute a second intermediate high-frequency manipulated residual image 513B having a resolution of $R/n$, which contains high-frequency residual information with pixel displacement that generally reflect that of the low-resolution manipulated image.

The second intermediate high-frequency manipulated residual image 513B is added to the second intermediate low-frequency manipulated image 509B, at an addition operation 514B, resulting in a second intermediate high-resolution manipulated image 515B. The resolution of the second intermediate high-resolution manipulated image 515B is the same as that of the first low-resolution image 503A, a resolution of $R/n$ (e.g., 512×512 pixels following the same example above).

The second intermediate high-resolution manipulated image 515B is up-sampled, by an up-sampler operation 508C, to generate a low-frequency manipulated image 509C. The second intermediate low-frequency manipulated image 509B has the same resolution as the original high-resolution image, a resolution of R (e.g., up-scaled from 512×512 pixels to 1024×1024 pixels following the same example above). The up-sampler operation 508C should perform up-sampling using the same technique as the up-sampler operations 508A, 508B, and 504 (e.g., using bilinear up-sampling).

The up-scaled motion field 511B is further up-sampled, by an up-sampler operation 510C, to generate an up-scaled motion field 511C. The up-scaled motion field 511C has the same resolution as the original high-resolution image, a resolution of R (e.g., 1024×1024 pixels following the same example above). The up-sampler operation 510C should perform up-sampling using the same technique as the up-sampler operations 504, 510A, and 510B (e.g., using bilinear up-sampling).

The up-scaled motion field 511C and the first high-frequency residual image 507A from the subtraction operation 506A are received by a warping module 512C. The warping module 512C applies the pixel displacement in the up-scaled motion field 511C to the first high-frequency residual image 507A to compute a high-frequency manipulated residual image 513C resolution of R, which contains high-frequency residual information with pixel displacement that generally reflect that of the low-resolution manipulated image.

The high-frequency manipulated residual image 513C is added to the low-frequency manipulated image 509C, at an addition operation 514C, resulting in a high-resolution manipulated image 520. The resolution of the high-resolution manipulated image, which is the output from the manipulation subsystem 105B, is the same as that of the original high-resolution image, a resolution of R. The high-resolution manipulated image 520 may be provided to be displayed to a user of the electronic device 110 and/or stored in the data storage 114 of the electronic device 110, for example.

Although progressive down-sampling and up-sampling factors of 2, 4 and 8 are described in the examples above, this is intended as a nonlimiting example for illustrative purposes only. Other down-sampling and up-sampling factors may be used in other examples. Similarly, although an exponential progression in the scaling factor is described where the down-sampling or up-sampling factor at a given step or stage is $n^i$, where n is the scaling factor and i is the $i^{th}$ step or stage in the down-sampling or up-sampling operations, this is intended as a nonlimiting example for illustrative purposes only. Other progressions in the scaling factor may be used in other examples.

It is understood that although components of the manipulation subsystem 105B, such as warping modules 512A, 512B, and 512C, are shown as separate components, they may be the same module.

Reference is again made to FIG. 4. Training of the manipulation generator 101 is now discussed. The manipulation generator 101 is trained using two discriminators 418A and 418B as well as a loss computation operation 420.

In an embodiment of the present disclosure, the training objectives include five terms, namely adversarial loss, driving loss, warp loss, refine loss, and the cycle loss. The adversarial loss may force the probability distribution on the set of images of the generated low-resolution manipulated image to be consistent with the distribution of the original high-resolution image. For example, there may be millions of images representing people's faces. Each image is considered to be a sample within these millions of images distribution. The driving loss is to ensure consistency between the low-resolution manipulated image and the desired manipulation identified in the driving signal. The warp loss is to ensure consistency between the coarse manipulated image and the desired manipulation identified in the driving signal. The refine loss is for ensuring consistency between the low-resolution manipulated image and the coarse manipulated image. The cycle loss is for ensuring the input low-resolution image may be recovered from the low-resolution manipulated image by using the deepest feature maps in the refinement network 404 as driving signal.

The manipulation generator 101 is trained using both discriminators 418A acting on the generated low-resolution image and 418B acting on the generated coarse manipulated image. Discriminator 418A receives the low-resolution image as input and predicts two logits: an adversarial logit that rates the realism of the image, and the driving logit that maps the input image (e.g., the low-resolution manipulated image) to the corresponding driving signal. The adversarial loss is based on a Wasserstein GAN (WGAN) with gradient penalty (GP). The adversarial loss for the discriminator 418A is expressed as:

$$l_{adv}^{D^r} = \mathbb{E}_{I \sim \mathbb{P}_I, c_t \sim \mathbb{P}_c}[D_{adv}^r(I) - d_{adv}^r(G(I,c_t))] + \sigma[|\nabla_{\hat{I}}(\hat{I})|_2 - 1]^2$$

where $D^r$ denotes the discriminator 418A, $D_{adv}^r(\cdot)$ is the adversarial logits of discriminator 418A; I, (G(I, $c_t$), and Î are real images (e.g., the low-resolution images used for training data), generated images (e.g., the low-resolution manipulated image), and the interpolations between them, respectively; and $\mathbb{P}$, and $\mathbb{P}$ are the corresponding distributions of I, and the driving signal $c_t$ separately; σ is the coefficient for the gradient penalty term, an exemplary value of which may be set to 10.

The driving loss is calculated by the loss computation operation 420. The driving loss is a calculation of the absolute difference between the output predicted by a neural network (e.g., the low-resolution manipulated image), and the target value (e.g., the desired manipulation defined by the driving signal). The driving loss is used during training to train the manipulation generator 101 to generate output that is consistent with the desired manipulation. The driving loss for the discriminator 418A is determined as follows:

$$l_{adv}^{D^r} = \mathbb{D}(c_s, D_{adv}^r(I))$$

where $\mathbb{D}(\cdot)$ is a measure of the disparity between the ground-truth $c_s$ and the adversarial logits generated from the discriminator 418A $D_{adv}^r(I)$. Depending on the form of the driving signals, $\mathbb{D}(\cdot)$ may vary. In some exemplary embodiments where the driving signal is an AU, cross entropy is used as $\mathbb{D}(\cdot)$ to indicate disparities of expressions categories and mean squared error (MSE) to measure distances of AU's.

Based on the above, the discriminator 418A is trained using the following loss function:

$$l^{D^r} = \lambda_{drv} l_{adv}^{D^r} + \lambda_{adv} l_{adv}^{D^r}$$

where $\lambda_{drv}$ and $\lambda_{adv}$ are coefficients for the driving loss and the adversarial loss terms, respectively. Exemplary values for a $\lambda_{drv}$ and a $\lambda_{adv}$ are 1.0 and 1.0, respectively.

The discriminator 418B, receiving the coarse manipulated image from warping module 406 as input, attempts to map the image to the corresponding driving signal. The discriminator 418B maps the image to a driving signal. This provides a check whether the signal matches the given driving signal. If it matches, it means the image is successfully warped to achieve the desired output. Therefore, the motion network 402 is trained with the driving loss written as:

$$l^{D^w} = \mathbb{F}(c_s, D^w(I))$$

where DW denotes discriminator 418B, $\mathbb{F}(\cdot)$ is a measure of the disparity between the ground-truth driving signal $c_s$ and the driving signal logits predicated by the discriminator 418B $D^w(I)$. If the warped image achieves the desired output, they two driving signals should match.

The adversarial loss for the entire manipulation generator 101 is defined as follows:

$$l_{adv} = -\mathbb{E}_{I \sim \mathbb{P}_I, c_t \sim \mathbb{P}_c} D_{adv}^r(G(I,c_t))$$

In addition, the cycle loss (also known as the reconstruction loss) to ensure consistency of the prediction with the original high-resolution image. In some embodiments, the L1 loss (also referred to as the L1-norm loss) is used to compute the cycle loss to encourage sharper image result. The L1 loss is a calculation of the absolute difference between the output predicted by a neural network, and the target value. The cycle loss is written as follows:

$$l_{adv} = |G(G(I,c_t),c_s) - I|$$

where |•| is the L1 loss operation between generated image and the input image I, $G(I,c_t)$ is the generated image based on the input image I and the driving signal $c_t$, $G(G(I,c_t),c_s)$ is an image generated from the generated image $G(I,c_t)$ and the ground truth $c_s$.

Further, the driving loss and warp loss ensures consistency of predictions (e.g., the coarse manipulated image and the low-resolution manipulated image) with the driving signal $c_t$. The driving loss and the warp loss are respectively written as follows:

$$l_{drv} = \mathbb{D}(c_t, D^r(O^r))$$

$$l_{warp} = \mathbb{D}(c_t, D^w(O^w))$$

where $O^r$ is the low-resolution manipulated image, and $O^w$ is the coarse manipulated image, and $\mathbb{D}(\cdot)$ is a measure of the disparity, such as MSE, between the two.

The refine loss ensures minimum modification to the coarse prediction $O^w$ to derive the refined prediction $O^r$. The refine loss is written as follows:

$$l_{ref} = |O^w - O^r|$$

where |•| is the L1 loss operation. The refine loss may be advantageous by maximizing the manipulation as result of warping such that the motion and appearance are fully decoupled, and hence the motion field is well aligned with the low-frequency and high-frequency components. The refine loss may further advantageously minimize the color variance caused by refinement to avoid image defects, such as color flicking, and may thus improve the temporal coherency of generated image sequences.

The motion network 402 and the refinement network 404 are trained simultaneously as parts of the manipulation generator 101. The loss of the entire manipulation generator 101, denoted as $l_g$, is defined as a weighted sum of the five losses described above as follows:

$$l_g = \lambda_{cyc} l_{cyc} + \lambda_{adv} l_{adv} + \lambda_{drv} l_{drv} + \lambda_{warp} l_{warp} + \lambda_{ref} l_{ref}$$

where $\lambda_{cyc}$, $\lambda_{adv}$, $\lambda_{drv}$, $\lambda_{warp}$, and $\lambda_{ref}$ are coefficients for each loss term. In some exemplary embodiments, the coefficients are set as $\lambda_{cyc}=10$, $\lambda_{adv}=1$, $\lambda_{drv}=1$, $\lambda_{warp}=0.5$, and $\lambda_{ref}=1.0$ is the coefficient for adversarial loss (e.g., $\beta=10-4$). It will be appreciated that the cycle loss and reconstruction loss in the present disclosure are the same loss. A value of 10 was used as the exemplar value in training. The coefficients (weights) are normally called hyper-parameters and do not need to be fixed values. Depending on the training dataset, the weights may need to be changed. The best values may be found empirically in some examples.

Figure 6:
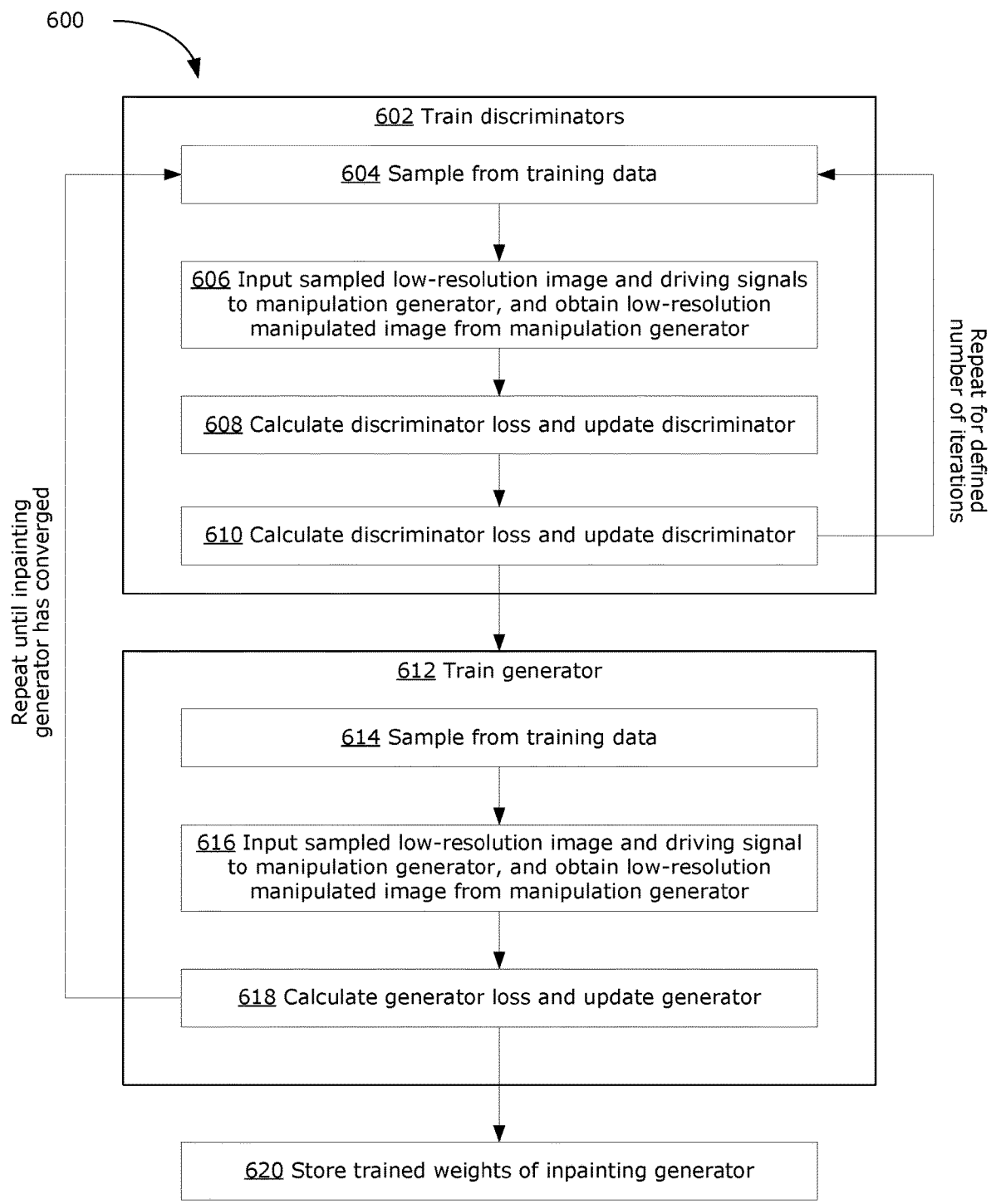
FIG. 6 is a flowchart of an example method for training a manipulation generator, in accordance with some embodiments of the present disclosure.

FIG. 6 is a flowchart illustrating an example training method 600 for training the manipulation generator 101. FIG. 7 shows pseudocode 700 of an example algorithm that may be used to implement the training method 600. The method 600 may be performed by the training device 120 shown in FIG. 1, for example. FIGS. 6 and 7 will be described together. It should be noted that the manipulation generator 101 is trained together with the discriminators 418A and 418B (according to GAN framework), however the discriminators 418A and 418B may not be used in the application stage.

The method 600 may start with an initialization step (not shown in FIG. 6), for example as shown at line 702 of the example pseudocode 700. Initialization may be performed to initialize temporary buffers, for example, which will be used to store values used in training, such as computed loss. Initialization may also be performed to initialize the weights of the discriminators 418A and 418B (denoted as $D^r$ and $D^w$, respectively, in FIG. 7) and the manipulation generator 101 (denoted as G in FIG. 7).

At 602, the discriminators 418A and 418B are trained for a defined number of iterations (e.g., five iterations). In this example, both the discriminators 418A and 418B are trained for a defined number of iterations per training iteration of the manipulation generator 101. In other examples, the discriminators 418A and 418B may be trained for only one iteration per training iteration of the manipulation generator 101. The iterations for training the discriminators 418A and 418B may be performed using a for loop, as indicated at line 706 of the pseudocode 700, for example.

Each training iteration for the discriminators 418A and 418B may be performed using steps 604-610, for example.

At 604, batch images I are sampled from training data. In this case, the training data are low-resolution images (e.g., images of 128×128 pixels in size, or smaller), which may be randomly sampled from the database 130 of FIG. 1, for example. Execution of line 708 of the pseudocode 700 results in a batch of images, denoted as I, being sampled from the training data, for batch training. At line 710 of the pseudocode 700, a set of driving signals, denoted as $c_t$, is randomly sampled from the training data for respective images in the batch I.

At 606, the low-resolution image and driving signals are provided as input to the manipulation generator 101, and a low-resolution manipulated image is obtained as output from the manipulation generator 101. In the case in which batch training is being performed, the input to the manipulation generator 101 is a batch of low-resolution images and a set of respective randomly sampled driving signals to be applied, and the output is a set of respective low-resolution manipulated images, denoted as $O^r$ (see line 712 of the pseudocode 700, for example).

At 608, the discriminator loss for the discriminator associated with the refinement network is calculated and used to update the weights of the discriminator 418A. The discriminator loss, denoted as $l^{D^r}$, may be calculated as described above.

At 610, the discriminator loss for the discriminator associated with the warping module of the motion network is calculated and used to update the weights of the discriminator 418B. The discriminator loss, denoted as $l^{D^w}$, may be calculated as described above.

For example, lines 714-716 of the pseudocode 700 illustrate example instructions that are executed to obtain $\hat{I}$ (which is the interpolation between the original sampled training data images I and the predicted low-resolution image $\tilde{I}$), which are used to calculate the discriminator loss $l^{D^r}$ and $l^{D^w}$. Lines 718 and 720 of the pseudocode then calculate the discriminator losses $l^{D^r}$ and $l^{D^w}$, and update the weights of the discriminators 418A and 418B, respectively (e.g., using gradient penalty).

If the discriminator training has completed the defined number of iterations (e.g., five iterations), then the method 600 proceeds to train the manipulation generator at step 612. Otherwise, the method 600 returns to step 602 to perform another training iteration for the discriminators 418A and 418B.

At step 612, the manipulation generator 101 is trained until the manipulation generator 101 converges (e.g., the weights of the manipulation generator 101 converges). Convergence may be checked for each training iteration, for example by calculating loss gradient or by calculating the weight gradient, and comparing against a defined convergence threshold. The iterations for training the manipulation generator 101 may be performed using a while loop, as indicated at line 704 of the pseudocode 700, for example.

Each training iteration for the manipulation generator 101 may be performed using steps 614-618, for example.

At 614, training data is sampled, similar to step 604. For consistency, the training data for the discriminators 418A, 418B and the training data for the manipulation generator 101 may be sampled from the same database and using the same sampling method. In this case, the training data are low-resolution images (e.g., images of 128×128 pixels in size, or smaller), which may be randomly sampled from the database 130 of FIG. 1, for example. The sampled training data may also include driving signals to be applied to the sampled images. In other examples, driving signals may be randomly generated during training, as discussed above. Execution of line 724 of the pseudocode 700 results in a batch of images, denoted as I, being sampled from the training data, for batch training. At line 726 of the pseudocode 700, a set of random driving signals, denoted as $c_t$, is sampled for respective images in the batch I.

At 616, the low-resolution image and driving signal are provided as input to the manipulation generator 101, and a low-resolution manipulated image is obtained as output from the manipulation generator 101. In the case in which batch training is being performed, the input to the manipulation generator 101 is a batch of low-resolution images and a set of respective random driving signals to be applied, and the output is a set of respective low-resolution manipulated images, denoted as $O^r$ (see line 728 of the pseudocode 700, for example).

At 618, the generator loss is calculated and used to update the weights of the manipulation generator 101. The generator loss, denoted as $l_g$, may be calculated according to the loss functions described above. Line 730 of the pseudocode then calculates the generator loss $l_g$, and updates the weights of the manipulation generator 101 (e.g., using gradient penalty).

If the manipulation generator 101 has sufficiently converged, then the method 600 proceeds to store the trained weights at step 620. Otherwise, the method 600 returns to step 602.

At 620, if the manipulation generator 101 has converged, the trained weights are stored, and the manipulation generator 101 is considered to be sufficiently trained for application.

The trained manipulation generator 101 may then be used by the electronic device 110 of FIG. 1, as part of the manipulation subsystem 105. The manipulation subsystem 105 may use the trained manipulation generator 101 to perform manipulation of high-resolution images, as discussed above.

Figure 8:
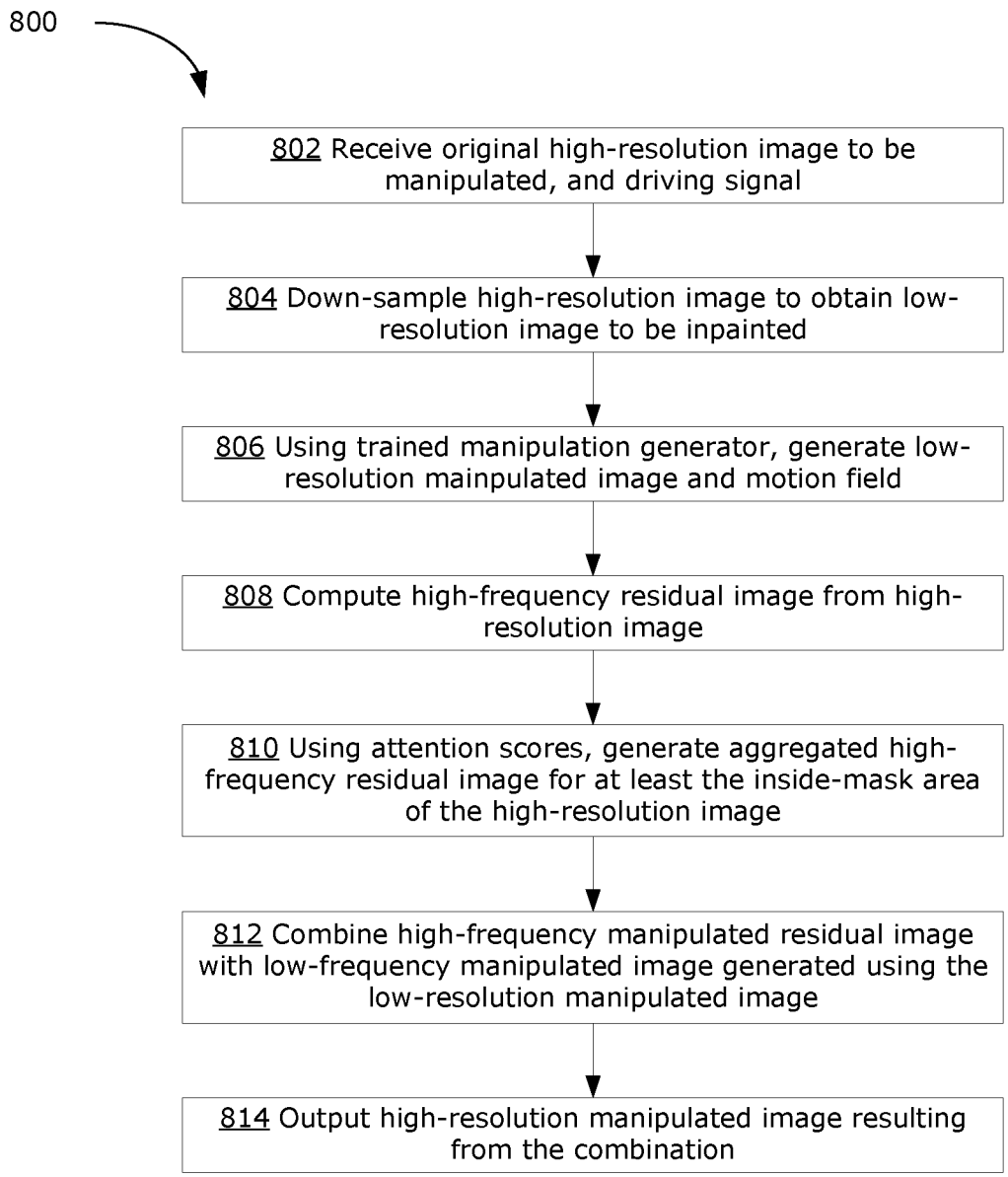
FIG. 8 is a flowchart of an example method for high-resolution image manipulation, in accordance with some embodiments of the present disclosure.

FIG. 8 is a flowchart illustrating an example method 800 for manipulation of a high-resolution image, using the trained manipulation generator 101. The method 800 may be performed by the electronic device 110 shown in FIG. 1, for example.

At 802, an original high-resolution image (e.g., image of size 1024×1024 pixels, 4K resolution image, 8K resolution image, or higher) is received to be manipulated. A driving signal indicating a desired manipulation result is also received. For example, the original high-resolution image may be a photograph or a set of video frames (e.g., a segment of a video) stored in the data storage 114 of the electronic device 110 and selected by a user for editing. The driving may be defined by the user (e.g., by the user manually creating a driving signal using an user interface provided by the electronic device). The driving signal may be AU's defining the desired manipulation result, an image containing the desired manipulation result, or a text phrase describing the manipulation result.

At 804, the original high-resolution image is down-sampled (e.g., by the first down-sampler operation 302 of FIG. 3) to obtain a low-resolution image (e.g., image of size 128×128 pixels, or smaller) to be manipulated.

At 806, the trained manipulation generator 101 is used to generate a low-resolution manipulated image and a motion field, as discussed above. Input to the trained manipulation generator 101 is the low-resolution image and the driving signal, and the low-resolution manipulated image outputted from the trained manipulation generator 101 is of the same resolution as the inputted low-resolution image. The motion field represents pixel displacements from the low-resolution image to the low-resolution manipulated image to satisfy the desired manipulation result indicated by the driving signal.

At 808, a high-frequency residual image is computed from the original high-resolution image. For example, this step may be performed by up-sampling the low-resolution image using the up-sampler operation 304, and subtracting the resulting low-frequency image from the original high-resolution image (see FIG. 3 or 5).

At 810, the motion field from the manipulation generator 101 is used (e.g., by the warping module 308 of FIG. 3 or 5) to generate a high-frequency manipulated residual image, which contains high-frequency residual information. As described above, the high-frequency manipulated residual image is generated by up-sampling the motion field generated from the manipulation generator 101. Then, the high-frequency residual image is warped, by displacing each pixel of the high-frequency residual image in accordance with the pixel displacement information identified in the up-sampled motion field.

At 812, the high-frequency manipulated residual image is combined with a low-frequency manipulated image generated from the low-resolution manipulated image generated at step 806. For example, the high-frequency residual image is combined with the low-frequency manipulated image using the addition operation 314 of FIG. 3. The low-frequency manipulated image may be generated from the low-resolution manipulated image using up-sampling by the up-sampler operation 310 of FIG. 3, for example.

In the example embodiment of FIG. 3, the down-sampling of the input image, up-sampling of the motion field and low-resolution manipulated image, and the warping of up-sampled motion field is each performed once. In the example embodiment of FIG. 5, the foregoing steps may be performed in a step-wise fashion where the input image is successively down-sampled to the lowest resolution in a plurality of intermediate steps. At each of the intermediate steps, a high-frequency residual image is generated and warped with a motion field up-sampled to the same pixel resolution. The warped image is added to a low-frequency manipulated image up-sampled, from the low-resolution manipulated image, to the same pixel resolution. The steps are repeated until the high-resolution manipulated image matches the pixel resolution of the original high-resolution image.

The result of the combining is a high-resolution manipulated image, which is outputted at step 814. The high-resolution manipulated image may be saved to the data storage 114 of the electronic device 110 of FIG. 1, and/or outputted to the user via an output device (e.g., a display) of the electronic device 110, for example.

In various examples, the present disclosure has described methods and systems for manipulation of high-resolution images. In some examples, the disclosed methods and systems may be used to manipulate images as large as 8K resolution (or larger). The disclosed methods and systems may enable manipulation of high-resolution images, with higher quality output compared to other existing rules-based or machine learning-based techniques.

In various evaluation tests, examples of the present disclosure have been found to perform high-resolution image manipulation using less computing resources than some other existing machine learning-based image manipulation techniques for high-resolution image manipulation, with better or comparable output quality.

Further, tests have found that examples of the present disclosure may improve the temporal coherency during manipulating or animating an image, which may be beneficial in providing satisfactory image quality for video sequences.

Further still, tests have found that examples of the present disclosure are capable of manipulating large high-resolution images (e.g., images of size 1024×1024 pixels), which is not possible using some other existing machine learning-based manipulation techniques due to limitations of memory resources in consumer-grade GPUs.

Compared to some other existing machine learning-based image manipulation techniques, the manipulation generator in the presently disclosed methods and systems is trained using low-resolution images, which significantly alleviates the requirements for a training dataset that includes high-resolution images (or ultra-high-resolution images). It should also be noted that, because the manipulation generator does not need to be trained using images of equal or higher resolution than the expected application input, the resolution of images to be manipulated during application of the trained manipulation generator may not be limited by the data on which the manipulation generator was trained.

A person of ordinary skill in the art may be aware that, in combination with the examples described in the embodiments disclosed in this disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that the disclosed systems and methods may be implemented in other manners. The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a universal serial bus (USB) flash drive, a removable hard disk, a read-only memory (ROM), a random access memory (RAM), a magnetic disk, or an optical disc, among others.

The foregoing descriptions are merely specific implementations of this application, but are not intended to limit the protection scope of this disclosure. Any variation or replacement readily figured out by a person skilled in the art within the technical scope disclosed in this disclosure shall fall within the protection scope of this disclosure.

The invention claimed is:

1. A method, executed in an electronic device, for high-resolution image manipulation, the method comprising:
obtaining an original high-resolution image to be manipulated, and a driving signal indicating a manipulation;
down-sampling the original high-resolution image to obtain a low-resolution image to be manipulated;
generating, from the low-resolution image based on the driving signal using a trained manipulation generator, a low-resolution manipulated image and a motion field, the motion field representing pixel displacements of the low-resolution image to obtain the manipulation indicated by the driving signal;
computing, from the original high-resolution image, a high-frequency residual image;
generating, using the motion field and the high-frequency residual image, a high-frequency manipulated residual image; and
outputting, as a high-resolution manipulated image, a combination of at least the high-frequency manipulated residual image and a low-frequency manipulated image, the low-frequency manipulated image being generated from the low-resolution manipulated image by up-sampling.

2. The method of claim 1, wherein the manipulation generator comprises a motion network and a refinement network, the motion network generating a coarse manipulated output from the low-resolution image, the coarse manipulated output and the low-resolution image being provided as input to the refinement network to output the low-resolution manipulated image with fewer visual artifacts than the coarse manipulated output and the refined motion field.

3. The method of claim 1, wherein the driving signal is any one of an Action Unit (AU) defining facial muscle movements as defined by the Facial Action Coding System (FACS) specifying the manipulation, an image showing the manipulation, and a text phrase describing the manipulation.

4. The method of claim 1, wherein the generating of the high-resolution manipulated residual image further comprises:
up-sampling the motion field from a resolution of the low-resolution image to a resolution of the original high-resolution image; and
applying pixel displacement defined in the up-sampled motion field to the high-resolution residual image.

5. The method of claim 1, wherein the computing of the high-resolution residual image further comprises:
up-sampling the low-resolution image to obtain a low-frequency image;
subtracting, pixel-wise, the low-frequency image from the original high-resolution image to obtain the high-resolution residual image.

6. The method of claim 1, wherein the manipulation generator is a trained generator network that was trained using low-resolution images as training data.

7. The method of claim 6, wherein the training data includes randomly sampled driving signals to be applied to the low-resolution images.

8. The method of claim 6, wherein the manipulation generator is trained using a loss function that is a weighted sum of adversarial loss, cycle loss, driving loss, refine loss, and warp loss.

9. The method of claim 8, wherein the refine loss is defined as:

$$l_{ref} = |O^w - O^r|$$

where $|\cdot|$ is a L1 loss operation between a coarse manipulated image prediction and a refined manipulated image prediction.

10. The method of claim 1, further comprising:
down-sampling the original high-resolution image to the low-resolution image through one or more intermediate low-resolution images, the at least one intermediate low-resolution image having an intermediate resolution that is less than a high-resolution of the original high-resolution image and greater than a low-resolution of the low-resolution image;
computing, from each of the one or more intermediate low-resolution images, an intermediate high-frequency residual image;

generating, from each intermediate high-frequency residual image, an intermediate high-frequency manipulated residual image using the motion field;

generating, from each intermediate high-frequency manipulated residual image, an intermediate low-frequency manipulated image by up-sampling; and generating an intermediate high-resolution manipulated image using the intermediate high-frequency manipulated residual image and an intermediate low-frequency manipulated image, the intermediate low-frequency manipulated image being generated from an intermediate low-resolution manipulated image from the lower intermediate resolution by up-sampling.

11. An electronic device, comprising:

a processor configured to execute instructions to cause the device to:
  obtain an original high-resolution image to be manipulated, and a driving signal indicating a manipulation;
  down-sample the original high-resolution image to obtain a low-resolution image to be manipulated;
  generate, from the low-resolution image using a trained manipulation generator, a low-resolution manipulated image and a motion field, the motion field representing pixel displacements to satisfy the manipulation indicated by the driving signal;
  compute, from the original high-resolution image, a high-frequency residual image;
  generate, using the motion field and the high-frequency residual image, a high-frequency manipulated residual image; and
  output, as a high-resolution manipulated image, a combination of at least the high-frequency manipulated residual image and a low-frequency manipulated image, the low-frequency manipulated image being generated from the low-resolution manipulated image by up-sampling.

12. The electronic device of claim 11, wherein the manipulation generator comprises a motion network and a refinement network, the motion network generating a coarse manipulated output from the low-resolution image, the coarse manipulated output and the low-resolution image being provided as input to the refinement network to output the low-resolution manipulated image with fewer visual artifacts than the coarse manipulated output and the refined motion field.

13. The electronic device of claim 11, wherein the driving signal is any one of an Action Unit (AU) defining facial muscle movements as defined by the Facial Action Coding System (FACS) specifying the manipulation, an image showing the manipulation, and a text phrase describing the manipulation.

14. The electronic device of claim 11, wherein the processor is configured to execute instructions to cause the device to generate the high-resolution manipulated residual image by:
  up-sampling the motion field from a resolution of the low-resolution image to a resolution of the original high-resolution image; and
  applying pixel displacement defined in the up-sampled motion field to the high-resolution residual image.

15. The electronic device of claim 11, wherein the processor is configured to execute instructions to cause the device to further compute the high-resolution residual image by:
  up-sampling the low-resolution image to obtain a low-frequency image;
  subtracting, pixel-wise, the low-frequency image from the original high-resolution image to obtain the high-resolution residual image.

16. The electronic device of claim 11, wherein the manipulation generator is a trained generator network that was trained using low-resolution images as training data, the training data also including randomly sampled driving signals to be applied to the low-resolution images.

17. The electronic device of claim 11, wherein the manipulation generator is trained using a loss function that is a weighted sum of adversarial loss, cycle loss, driving loss, refine loss, and warp loss.

18. The device of claim 17, wherein the refine loss is defined as:

$$l_{ref} = |O^w - O^r|$$

where $|\cdot|$ is a L1 loss operation between a coarse manipulated image prediction and a refined manipulated image prediction.

19. The electronic device of claim 11, wherein the processor is further configured to execute instructions to cause the device to:
  down-sample the original high-resolution image to the low-resolution image through at least one intermediate low-resolution image, the at least one intermediate low-resolution image having an intermediate resolution that is less than a high-resolution of the original high-resolution image and greater than a low-resolution of the low-resolution image;
  compute, from each of the at least one intermediate low-resolution image, a medium-frequency residual image;
  generate, using the motion field and the medium-frequency residual image from a lower intermediate resolution, a medium-frequency manipulated residual image;
  generate, using a medium-resolution manipulated image from a lower intermediate resolution, an intermediate low-frequency manipulated image; and
  generate a medium-resolution manipulated image using the medium-frequency manipulated residual image and an intermediate low-frequency manipulated image, the intermediate low-frequency manipulated image being generated from an intermediate low-resolution manipulated image from the lower intermediate resolution.

20. A non-transitory machine-readable storage medium having tangibly stored thereon executable instructions for execution by a processor of an electronic device, wherein the executable instructions, in response to execution by the processor, cause the electronic device to:
  obtain an original high-resolution image to be manipulated, and a driving signal indicating a manipulation;
  down-sample the original high-resolution image to obtain a low-resolution image to be manipulated;
  generate, from the low-resolution image using a trained manipulation generator, a low-resolution manipulated image and a motion field, the motion field representing pixel displacements to satisfy the manipulation indicated by the driving signal;
  compute, from the original high-resolution image, a high-frequency residual image;
  generate, using the motion field and the high-frequency residual image, a high-frequency manipulated residual image; and
  output, as a high-resolution manipulated image, a combination of at least the high-frequency manipulated residual image and a low-frequency manipulated image, the low-frequency manipulated image being generated from the low-resolution manipulated image by up-sampling.

\* \* \* \* \*

UNITED STATES PATENT AND TRADEMARK OFFICE
CERTIFICATE OF CORRECTION

PATENT NO. : 11,915,383 B2
APPLICATION NO. : 17/367524
DATED : February 27, 2024
INVENTOR(S) : Zili Yi et al.

It is certified that error appears in the above-identified patent and that said Letters Patent is hereby corrected as shown below:

In the Specification

Column 21, Lines 30-32, the equation should read:

$$-- l_{adv}^{D^r} = \mathbb{E}_{I \sim \mathbb{P}_I, c_t \sim \mathbb{P}_c}[D_{adv}^r(I) - D_{adv}^r(G(I, c_t))] + \sigma \left[ \left\| \nabla_{\hat{I}} D_{adv}^r(\hat{I}) \right\|_2 - 1 \right]^2 --$$

Column 21, Line 38:
"respectively; and $\mathbb{P}$, and $\mathbb{P}$ are the corresponding distribu-"

Should read:
-- respectively; and $\mathbb{P}_I$, and $\mathbb{P}_c$ are the corresponding distribu- --

Column 22, Line 65, the equation should read:
-- $l_g = \lambda_{cyc} l_{cyc} + \lambda_{adv} l_{adv} + \lambda_{drv} l_{drv} + \lambda_{warp} l_{warp} + \lambda_{ref} l_{ref}$ --

Signed and Sealed this
Thirtieth Day of April, 2024

Katherine Kelly Vidal
*Director of the United States Patent and Trademark Office*